(12) United States Patent
Kayser et al.

(10) Patent No.: US 6,266,052 B1
(45) Date of Patent: Jul. 24, 2001

(54) POWER AND INFORMATION DISTRIBUTION SYSTEM FOR ARTICLE DISPLAY OR STORAGE AREAS AND RELATED METHOD

(75) Inventors: Kenneth W. Kayser, St. Charles; W. Richard Frederick, Mundelein, both of IL (US)

(73) Assignee: Display Edge Technology, Ltd., Dayton, OH (US)

( * ) Notice: Subject to any disclaimer, the term of this patent is extended or adjusted under 35 U.S.C. 154(b) by 0 days.

(21) Appl. No.: 09/309,082

(22) Filed: May 10, 1999

Related U.S. Application Data

(62) Division of application No. 08/647,664, filed on May 15, 1996, which is a continuation of application No. 08/116,468, filed on Sep. 3, 1993, now Pat. No. 5,537,126.

(51) Int. Cl.[7] .................................................. G09G 5/00
(52) U.S. Cl. ................................................. 345/211; 345/1
(58) Field of Search .............................. 345/1, 2, 87, 211, 345/212; 340/825.47, 825.49; 40/455, 448, 452, 447, 541, 542; 348/730; 307/31, 38; 365/227, 229; 323/326, 370

(56) References Cited

U.S. PATENT DOCUMENTS

| | | |
|---|---|---|
| 3,086,308 | 4/1963 | Ternouth . |
| 3,256,512 | 6/1966 | Pickett et al. . |
| 3,622,992 | 11/1971 | Schoenwitz . |
| 4,002,886 | 1/1977 | Sundelin . |
| 4,139,149 | 2/1979 | Crepeau et al. . |
| 4,500,880 | 2/1985 | Gomersall et al. . |

(List continued on next page.)

FOREIGN PATENT DOCUMENTS

| | | |
|---|---|---|
| 4206793 | 9/1993 | (DE) . |
| 4237467 | 5/1994 | (DE) . |
| 4432640 | 10/1995 | (DE) . |
| 006691 | 6/1979 | (EP) . |
| 0243810 | 11/1987 | (EP) . |
| 0423188 | 4/1991 | (EP) . |
| 0 463 341 A1 | 1/1992 | (EP) . |

(List continued on next page.)

OTHER PUBLICATIONS

RD34494—*Electronic Price Tag*, Research Disclosure (12/92), p. 969.

Primary Examiner—Chanh Nguyen
(74) Attorney, Agent, or Firm—Thompson Hine LLP

(57) ABSTRACT

A product information display system has electronic display tags for displaying pricing and product information for products in stores or warehouses. The electronic display tags are electromagnetically coupled to a conductor. A control circuit is used to generate an information signal which contains a tag address and related data. A modulator circuit modulates an a-c. power signal with the information signal and applies it to the conductor for transmission to the display tags. Each of the display tags is equipped with a coil that is electromagnetically coupled to the conductor for picking up the signals carried by the conductor. A demodulator is used to demodulate the signal picked up by the coil to obtain the original information signal. Each of the display tags is provided with a manually operated switch for initializing the tags with initial addresses transmitted by the conductor. A microprocessor in the electronic tag then compares the address contained in subsequent information signals with the address stored in the tag's memory. If the addresses match, the microprocessor further processes the information signal for visual display or verification functions.

3 Claims, 20 Drawing Sheets

U.S. PATENT DOCUMENTS

| | | |
|---|---|---|
| 4,521,677 | 6/1985 | Sarwin . |
| 4,525,713 | 6/1985 | Barletta et al. . |
| 4,603,495 | 8/1986 | Stevens . |
| 4,654,514 | 3/1987 | Watson et al. . |
| 4,702,558 | 10/1987 | Coles et al. . |
| 4,745,404 | 5/1988 | Kallenberg . |
| 4,766,295 | 8/1988 | Davis et al. . |
| 4,791,739 | 12/1988 | Hetzer . |
| 4,796,028 | 1/1989 | Mackenthun et al. . |
| 4,821,291 | 4/1989 | Stevens et al. . |
| 4,833,337 | 5/1989 | Kelley et al. . |
| 4,833,338 | 5/1989 | Bartlett et al. . |
| 4,864,633 | 9/1989 | Chatelot . |
| 4,879,756 | 11/1989 | Stevens et al. . |
| 4,937,586 | 6/1990 | Stevens et al. . |
| 4,939,861 | 7/1990 | Soublière . |
| 4,941,201 | 7/1990 | Davis . |
| 4,955,000 | 9/1990 | Nastrom . |
| 4,962,466 | 10/1990 | Revesz et al. . |
| 5,019,811 | 5/1991 | Olsson et al. . |
| 5,054,112 | 10/1991 | Ike . |
| 5,111,196 | 5/1992 | Hunt . |
| 5,160,920 | 11/1992 | Harris . |
| 5,172,314 | 12/1992 | Poland et al. . |
| 5,198,644 | 3/1993 | Pfeiffer et al. . |
| 5,241,467 | 8/1993 | Failing et al. . |
| 5,241,657 | 8/1993 | Fine et al. . |
| 5,245,534 | 9/1993 | Waterhouse et al. . |
| 5,260,701 | 11/1993 | Guern et al. . |
| 5,293,400 | 3/1994 | Monod et al. . |
| 5,345,231 | 9/1994 | Koo et al. . |
| 5,348,485 | 9/1994 | Briechle et al. . |
| 5,374,815 | 12/1994 | Waterhouse et al. . |
| 5,404,149 | 4/1995 | Joliey . |
| 5,442,343 | 8/1995 | Cato et al. . |
| 5,448,226 | 9/1995 | Failing, Jr. et al. . |
| 5,461,561 | 10/1995 | Ackerman et al. . |
| 5,465,085 | 11/1995 | Caldwell et al. . |
| 5,467,474 | 11/1995 | Ackerman et al. . |
| 5,473,832 | 12/1995 | Briechle et al. . |
| 5,504,475 | 4/1996 | Houdou et al. . |
| 5,521,590 | 5/1996 | Hanaoka et al. . |
| 5,532,465 | 7/1996 | Waterhouse et al. . |
| 5,539,393 | 7/1996 | Barford . |
| 5,548,282 | 8/1996 | Escritt et al. . |
| 5,553,412 | 9/1996 | Briechle et al. . |
| 5,557,085 | 9/1996 | Tyren et al. . |
| 5,559,507 | 9/1996 | Beigel . |
| 5,560,970 | 10/1996 | Ludebühl . |
| 5,564,210 | 10/1996 | Hetzer et al. . |
| 5,572,653 | 11/1996 | DeTemple et al. . |
| 5,575,100 | 11/1996 | Marvin et al. . |
| 5,583,487 | 12/1996 | Ackerman et al. . |
| 5,632,010 | 5/1997 | Briechle et al. . |

FOREIGN PATENT DOCUMENTS

| | | |
|---|---|---|
| 0497533 | 8/1992 | (EP) . |
| 0604382 | 6/1994 | (EP) . |
| 0708409 | 10/1994 | (EP) . |
| 0712086 | 11/1994 | (EP) . |
| 0683478 | 11/1995 | (EP) . |
| 0710916 | 5/1996 | (EP) . |
| 2240416 | 7/1991 | (GB) . |
| 2249854 | 5/1992 | (GB) . |
| 2257278 | 1/1993 | (GB) . |
| 2266401 | 10/1993 | (GB) . |
| 2275807 | 9/1994 | (GB) . |
| 2 202 414 | 9/1998 | (GB) . |
| 2-287591 | 11/1990 | (JP) . |
| 4-303294 | 10/1992 | (JP) . |
| 7319395 | 12/1995 | (JP) . |
| 91030486 | 4/1993 | (SE) . |
| WO8806773 | 9/1988 | (WO) . |
| WO9014630 | 11/1990 | (WO) . |
| WO9108539 | 6/1991 | (WO) . |
| WO9111063 | 7/1991 | (WO) . |
| WO 92/09054 | 5/1992 | (WO) . |
| WO9305456 | 3/1993 | (WO) . |
| WO9311509 | 6/1993 | (WO) . |
| WO9400895 | 1/1994 | (WO) . |
| WO9411833 | 5/1994 | (WO) . |
| WO9411834 | 5/1994 | (WO) . |
| WO9411835 | 5/1994 | (WO) . |
| WO9417615 | 8/1994 | (WO) . |
| WO9423381 | 10/1994 | (WO) . |
| WO9522798 | 8/1995 | (WO) . |
| WO9523389 | 8/1995 | (WO) . |
| WO9614630 | 5/1996 | (WO) . |
| WO9625730 | 8/1996 | (WO) . |
| WO9627957 | 9/1996 | (WO) . |
| 8900714 | 8/1989 | (ZA) . |

POWER AND INFORMATION DISTRIBUTION SYSTEM FOR ARTICLE DISPLAY OR STORAGE AREAS AND RELATED METHOD

This is a divisional of prior application Ser. No. 08/647,664 filed May 15, 1996, which in turn is a continuation of application Ser. No. 08/116,468 filed Sep. 3, 1993, which is now U.S. Pat. No. 5,537,126.

FIELD OF THE INVENTION

The present invention relates generally to an article information-display system (which can include two-way communication) for use in facilities having a multitude of different articles. The system displays information for the individual articles and the displays can be updated from a central location. Where the facility is a store, for example, the invention is useful for displaying the price and name of each product on electronic display tags adjacent the respective products.

BACKGROUND OF THE INVENTION

There have been a number of proposals to automate retail price displays by the use of electronic price tags. To the extent such systems replace printed price tags, these systems are appealing to store owners because they reduce or eliminate the need to reprint and replace item price tags each time the price of an item is changed. This benefits the retailer by reducing or eliminating: the labor required to replace the price tags; the possibility of human error in replacing the price tags; the time lag involved in changing prices; and the difficulty in changing a large number of prices at once. Perhaps most importantly, such systems have the ability to overcome price discrepancies between the tag and the checkout scanners.

Problems have been encountered, however, in providing the requisite information and power to the electronic tags at a reasonable cost. Also, some systems still require printed product description labels on the tags to supplement the electronic tags and thus do not eliminate the problems they were intended to solve. In systems in which the electronic tags are hard wired, installation and removal of the electronic tags is expensive and impractical. Systems which use exposed wires and connectors are undesirable because they reduce the system's reliability and subject the system to damage from electrostatic discharges, spillage and surface oxides. Other systems lack the ability to verify the accuracy of the displays and the proper functioning of the electronic tags while the system is in operation.

A number of wireless display systems have been proposed which rely on infrared, acoustic, or radio frequency broadcast for transmission of product information to the display tags. These wireless tags require a battery for powering each tag. Adding a battery to the tag increases the cost of each tag and can make the overall system unaffordable for many applications. Moreover, since a single retail establishment often contains as many as 20,000 to 50,000 display tags, replacement of the batteries and reprogramming such a large number of tags is time-consuming and costly. The radiated signals can also be shielded, for example, by steel freezer cases, causing communication "dead spots" in a store. Moreover, disposing of batteries has an adverse environmental impact. If there are just 50,000 installations with 20,000 tags each, that is a billion batteries that have to be disposed of on a routine basis, and the labor involved in replacing the batteries and reprogramming at each battery change is costly as well. Effective use of such systems requires a battery management system so that the batteries can be replaced before failure, or before the quality of the tag's display diminishes to an unacceptable level. Further, because the tags in a wireless system generally do not communicate problems to the computer, the tags have to be visually monitored to identify problems such as bad or faint tags.

Another problem in most previously proposed electronic display tag systems is that the tags have been relatively thick, causing them to protrude from the shelf rails on which they are mounted. Protruding tags are subject to damage by shopping carts, and they can impede the movement of store customers within the aisles. Further, the protrusion of the tags into the aisle invites tampering and can result in theft of the electronic tags.

SUMMARY OF THE INVENTION

It is a primary object of the present invention to provide an improved electronic display tag system in which the tags require neither batteries nor direct electrical contacts, as a result of which the tags can be economically produced and maintained with a high degree of reliability.

It is another object of this invention to provide an improved electronic display tag system which is extremely energy-efficient and which can be sustained during prolonged power outages without the use of batteries in the tags, so that there is no need to re-initialize the system after a power outage.

Another important object of this invention is to provide an improved electronic display tag system in which each tag is a sealed unit so that it cannot be damaged by the spillage of products stored adjacent the tags, and so that there are no exposed electrical contacts subject to corrosion or ESD.

A further object of this invention is to provide an improved electronic display tag system which provides two-way communication between the display tags and the controller or controllers for the tags. A related object is to provide such an improved electronic display tag system which permits continual verification of the accuracy of the displays and the proper functioning of the various display tags.

Yet another object of this invention is to provide an improved electronic display tag system which does not rely on radio frequency (RF) signals or infrared signals and thus is not susceptible to problems from blockage or shielding of such signals or interference from other equipment using similar frequencies.

A still further object of the invention is to provide an improved electronic display tag system which permits the display tags to be located at any desired position along the lengths of the shelves on which the products are located.

Another object of this invention is to provide an improved electronic display tag system which does not produce radiation emission problems.

Still another object of this invention is to provide an improved electronic display tag system which can be easily and efficiently initialized.

It is also an object of this invention to provide an improved electronic display tag system which deters tampering and reduces the possibility of damage by recessing the tags and concealing most other functional elements.

A further important object of this invention is to provide an improved electronic display tag system which permits the display of a variety of different types of product information such as prices, product descriptions, unit prices, multilingual information and the like.

Another object is to provide an improved electronic display tag system which is extremely reliable and has a relatively small number of parts so as to provide a high MTBF (Mean Time Between Failure).

A further object is to provide an improved electronic display tag system which does not involve any significant waste disposal problems.

Other objects and advantages of the invention will be apparent from the following detailed description and the accompanying drawings.

In accordance with the present invention, the foregoing objectives are realized by providing an electronic display tag system which includes a multiplicity of electronic display tags, an electrical power supply for supplying a-c. power for the multiplicity of the display tags, a controller circuit for providing information signals for the multiplicity of the display tags, a modulator receiving the power signal and the information signals for modulating the power signal with the information signals, at least one electrical conductor connected to the modulator and passing in close proximity to a plurality of the electronic display tags for carrying the modulated power signal to the display tags, a pick-up coil within each display tag and electromagnetically coupled to the conductor for receiving the modulated power signal, a demodulator within each display tag for demodulating the modulated power signal, and a display circuit within each display tag for generating a display in response to the information signals derived from the demodulated signal.

In a preferred embodiment, the product information display system is initialized by initially transmitting information signals for successive products with successive tag addresses, and sequentially initializing individual display tags via manually operable control means provided on each tag for accepting a transmitted tag address and the information signals transmitted therewith.

A preferred embodiment of the electronic tag includes a resonant circuit containing the pick-up coil, and an electronically controllable switching device in parallel with the resonant circuit for modulating the impedance of the tag and thereby modulating the alternating signal in the conductor to produce a sub-harmonic frequency current in the conductor. The impedance modulation may be controlled by manually operable switches on the tags for generating input signals representing information to be transmitted from the tag to its area controller, and a tag microprocessor responsive to those input signals or signals from the area controller for controlling the modulation of the tag impedance.

DETAILED DESCRIPTION OF THE PREFERRED EMBODIMENTS

The present invention has application in a variety of article-information display environments. These environments include, among others, grocery stores, hardware stores, auto-parts stores, warehouses, and other establishments where variable article information is displayed at remote locations. The present invention is particularly advantageous when it is used in a large store where there may be as many as 50,000 different items of merchandise placed on shelves throughout the store, and thousands of prices may change each week. Such an environment is typical in a retail grocery store, and it is this context that the present invention will be described. This invention is also particularly useful in warehouses containing numerous bins of small parts that are coded or marked with other types of identifications which are difficult to read.

Figure 1:
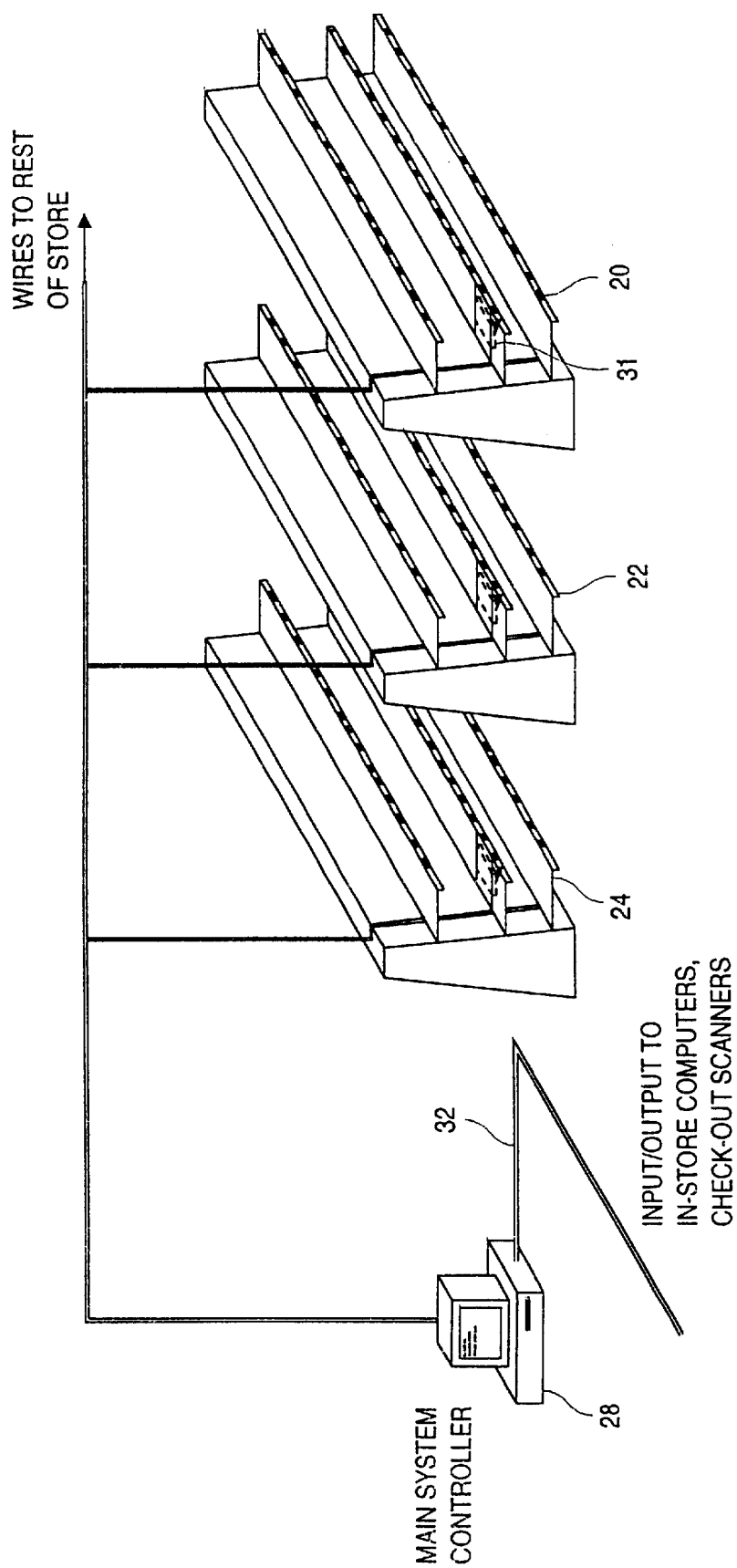
FIG. 1 is a perspective view of a typical layout of part of a retail store equipped with a product information display system arranged in accordance with the present invention.

FIG. 1 depicts part of a retail store including a product information display system arranged according to a preferred embodiment of the present invention. The system includes a plurality of display tags 20 disposed along the front rails 22 of the store's multiple display shelves 24. The prices, descriptions and/or special information for all the products are displayed on the front edges of the shelves, near the respective products. Typically, there is a one-to-one correspondence between each display tag 20 and a particular item of merchandise. Although certain applications may require a display tag 20 to display product-related information regarding multiple products, e.g., the respective products above and below the display tag 20, preferably each display tag 20 displays information for only one product.

The information to be displayed at each display tag 20 is provided by a system controller 28. The system controller 28 communicates with the display tags 20 through a shelf-mounted area controller 31 using multiple conductors $C_1$, $C_2$ ... $C_n$, each of which forms a large loop to communicate with a large number of display tags 20 in a prescribed area. Typically a single area controller 31 services at least 1000 tags, and each loop services several hundred tags. Each area controller 31 is contained in an enclosed housing which is mounted in a relatively hidden position on the bottom side of one of the shelves. The system controller 28 regularly communicates with the display tags for monitoring and reporting display tag failures to the system user and for identifying service inquiries and updating the display information, e.g., with price changes.

The display tags serviced by any one of the wire loops are usually located on a number of different shelves. By limiting the length of a horizontal run of the conductor C to four feet (a typical modular shelf length), non-contiguous shelf lengths can be accommodated with the conductor C weaving across one four-foot length, below to the underlying four-foot length, etc. The bottom shelf, however is typically a single unit extending along the entire length of an aisle, and thus the conductor C preferably extends continuously along the entire length of the bottom shelf.

FIG. 1 also illustrates a communication link 32 between the system controller 28, an in-store computer and check-out scanners (not shown in FIG. 1). This link 32 is also used by the system controller to receive update price information from the store computer (not shown). The same computer supplies data to both the tags and the scanners so that a new price for a particular product is updated in the display tag 20 at the same time the price is sent to the check-out scanners, thereby ensuring that the price displayed on the display tag 20 for the product is the same as the price displayed for and charged to the customer at the check-out scanner.

Figure 2:
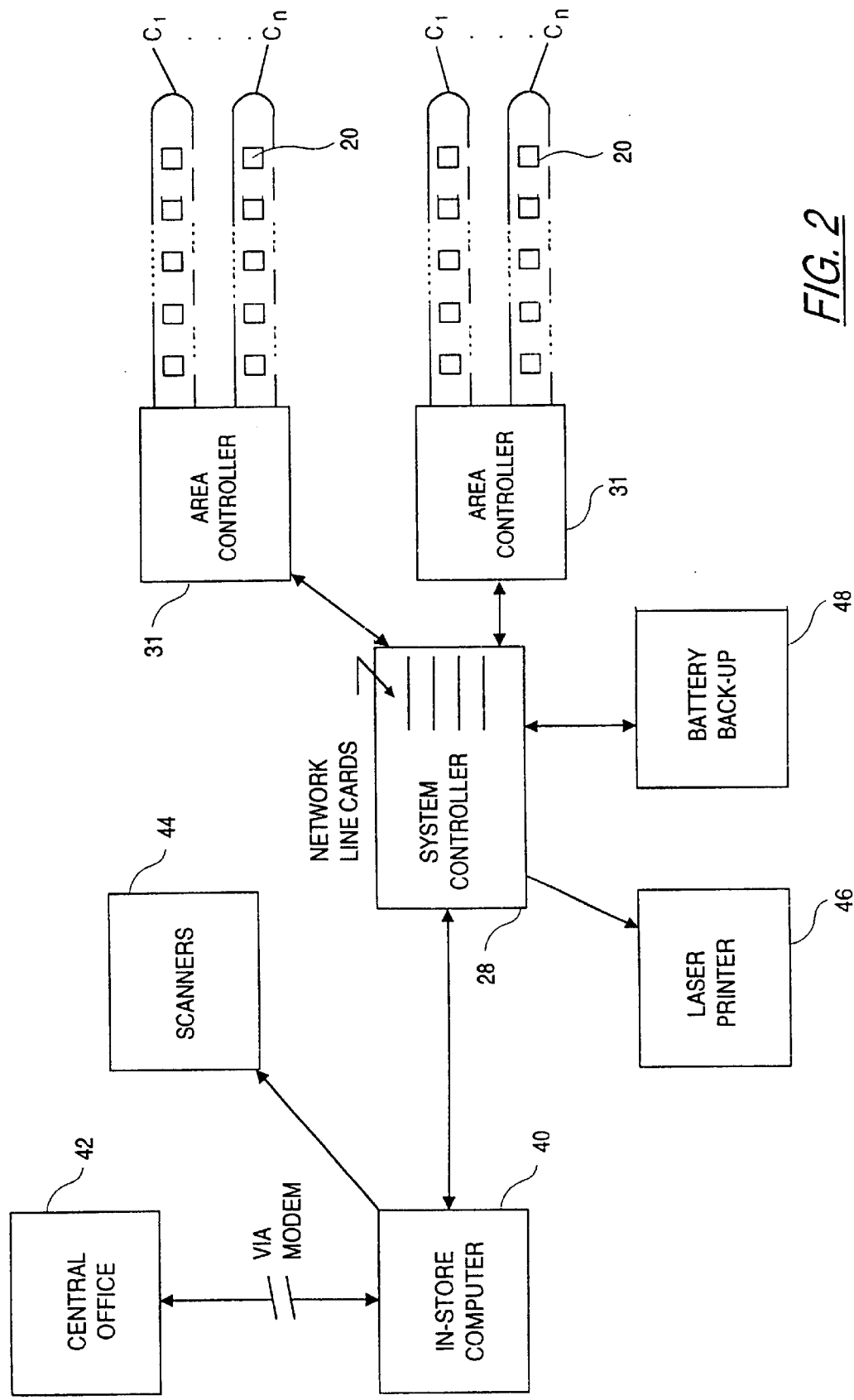
FIG. 2 is a block diagram of a product information display system, also in accordance with the present invention.

FIG. 2 illustrates the product information display system of FIG. 1 in block form. The system includes a plurality of area controllers 31 coupling the system controller 28 to various sets of display tags 20. Each set of display tags 20 is associated with one of the multiple wire loops $C_1$-$C_n$ connected to each area controller 31. The area controllers 31 communicate with the tags 20 using a conventional modulation protocol such as amplitude-shift-keying (ASK), which is a binary form of amplitude modulation. Other communication schemes, such as frequency shift keying (FSK) or phase modulation, can be used instead of ASK if desired. Communication between the area controllers 31 and the system controller 28 is effected using a conventional serial two-way communication protocol, preferably a network interface compatible with the RS422 or RS485 standard. Each of the area controllers 31 is powered by a d-c. power supply within the system controller 28.

By controlling the display tags 20 through the area controllers 31, several advantages are realized. For instance, the communication speed between the system controller 28 and the display tags 20 is increased (because it is not necessary for the system to talk to each tag), the processing power required in the system controller 28 is decreased, and a level of modularity is provided for expanding use of the display tags 20. Further, use of the area controllers 31 significantly reduces the cost of the system by avoiding the need for an RS485 type interface at each tag.

Both the tags and the area controllers store data and with their interactive communications check each other as part of the auditing and failure identification system. There is redundant power back-up with a battery in the system controller and in each area controller. The cost of individual tags is reduced because certain of the electronics in the area controller does not have to be duplicated in thousands of tags, and there is more flexibility for special display messages.

The system of FIG. 2 also includes an in-store computer 40 which communicates with a remotely located central office 42 using a modem. The in-store computer 40 provides a database of information, received from the central office 42 (or from a scanner controller), for all the merchandise in the store. The database is used to link each product with a physical-location address, an alpha-numeric (or UPC) description, a price, and a unit cost and general inventory information. The database may be accessed for the checkout scanners 44 as well as the system controller 28. Changes in the database of the in-store computer 40 are generally initiated by updates received from the central office, but database changes producing display changes can also be made directly at the in-store computer 40.

After receiving the product data from the in-store computer 40, the system controller 28 selects the desired display information and associated display tag address, and converts this display information into a data stream for transmission to the appropriate area controller 31. The area controller 31 then forwards this information to the particular wire loop $C_1$-$C_n$ which includes the designated tag 20.

Also associated with the system controller 28 is a printer 46 and a battery back-up unit 48. The printer 46 may be used to make hard copies of the desired displays, for example on regular or transparent paper, for insertion into a shelf rail at any locations not covered by the electronic tags 20. The printer can also be used to generate store or system reports. The battery back-up unit 48 is used to maintain system integrity during periods of power interruption.

Figure 3:
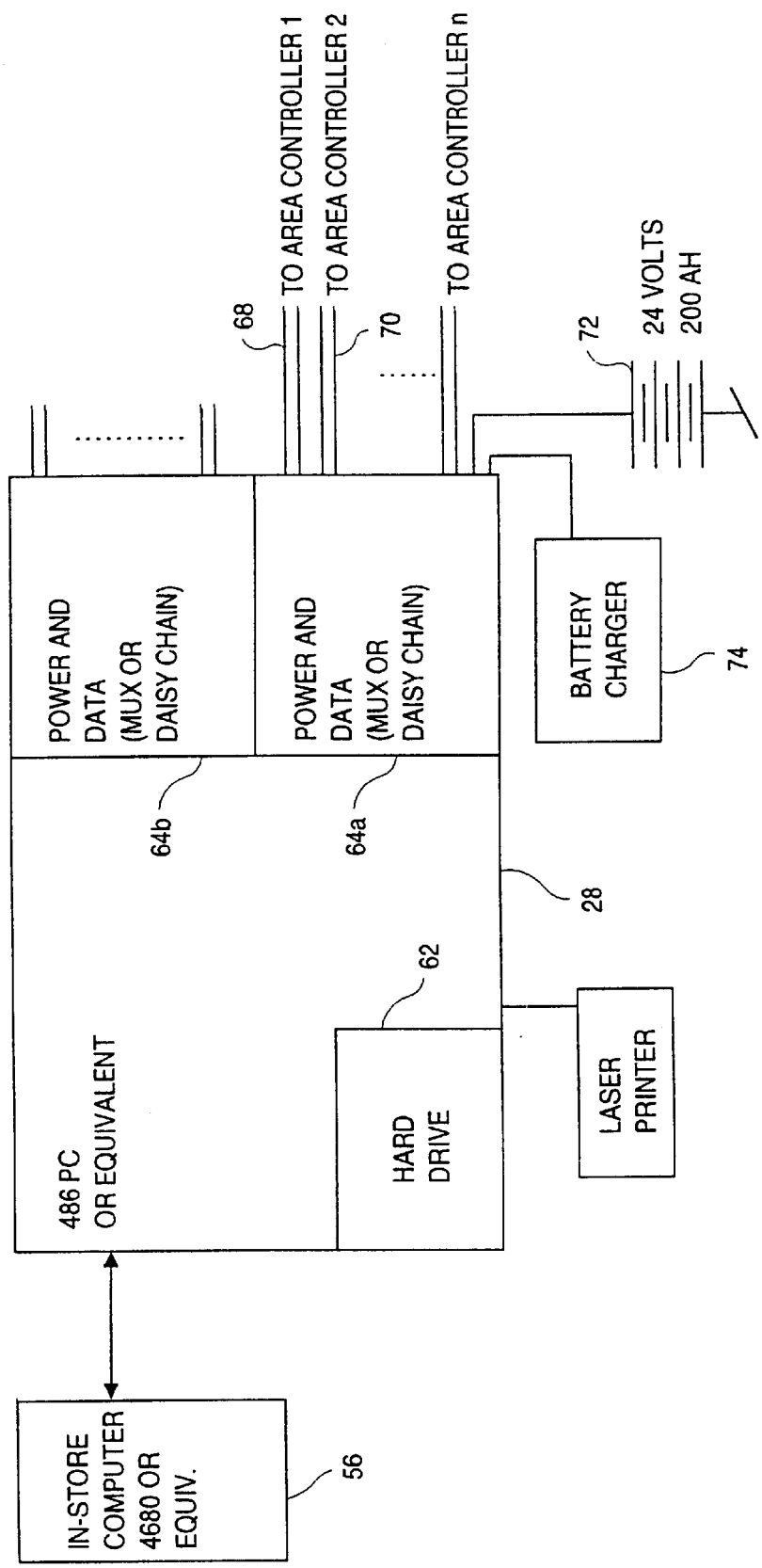
FIG. 3 is a block diagram of the system controller shown in FIGS. 1 and 2.

As illustrated in FIG. 3, the system controller 28 may be implemented using a personal computer 28 (such as a 486 or equivalent) containing a number of network boards configured for serial two-way communication with the area controllers 31. Or communication can be accomplished with conventional RS422/RS485 interfaces or equivalent. The system controller 28 also contains a conventional hard-drive 62 for programs, protocols, addresses and storage, and power and data distribution circuits 64a, 64b, etc. for all the area controllers 31 in the system. Each distribution circuit 64 transmits and receives serial data over one set of lines 68 and sends d-c. power over another set of lines 70. A rechargeable 24-volt d-c. battery 72 is used as the power source, with an a-c.-powered battery charger 74 activated as necessary to maintain an adequate charge on the battery 72. The battery 72 is the primary power source for the area controllers 31, emergency power for the system is also provided from this battery.

Figure 4:
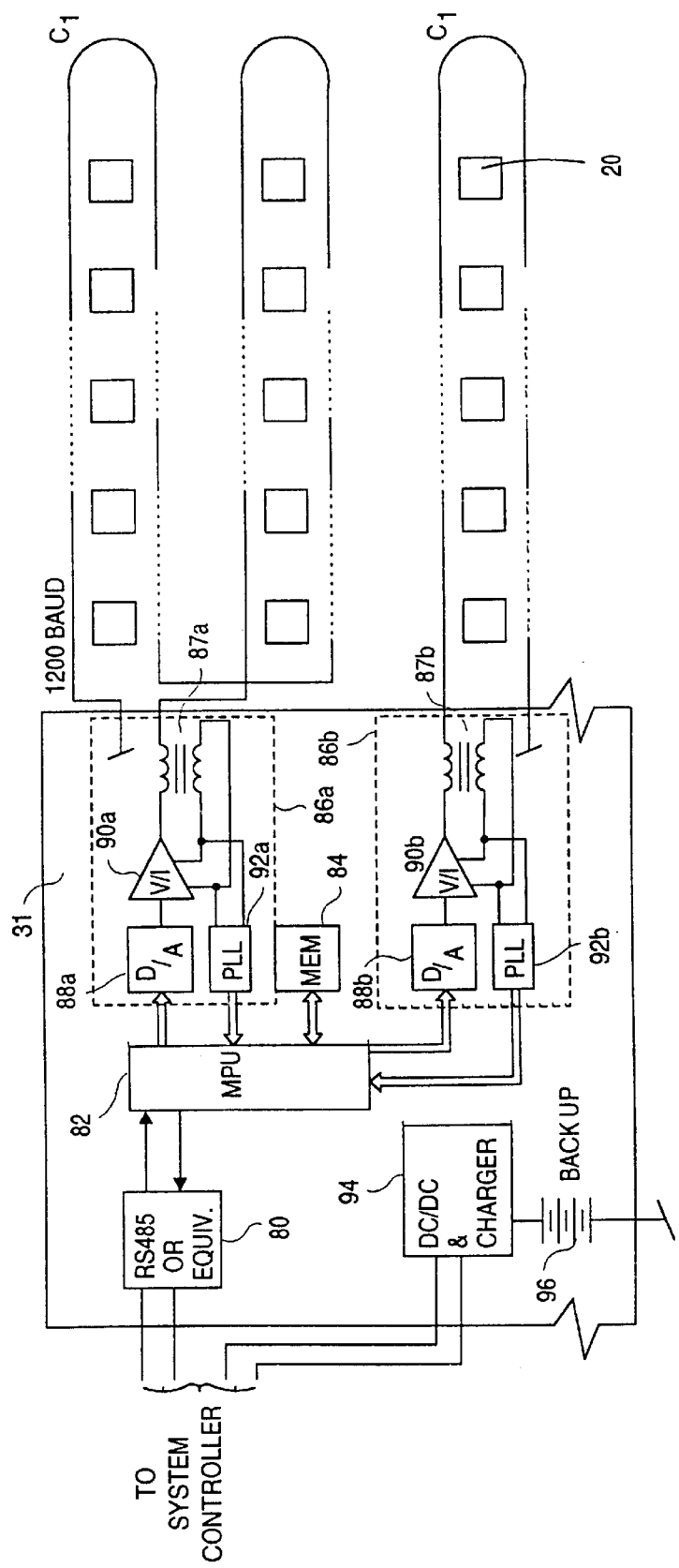
FIG. 4 is a block diagram of one of the area controllers shown in the system of FIG. 2.

Referring now to FIG. 4, one of the area controllers 31 is shown in expanded form. Each area controller 31 receives the data from the outputs of the network boards of the system controller 28 and translates the data into an information/power signal that is applied to one of the conductors $C_1$-$C_n$ for transmission to the display tags. Data transmission to the tags is typically at 1200 baud using ASK.

Each area controller 31 includes a network interface circuit 80 such as an RS485 transceiver circuit, a microcomputer or microprocessor (MPU) 82, a memory 84, and a plurality of transceiver circuits 86, one for each of the conductors $C_1$-$C_n$. Using the transceiver circuits, the microprocessor 82 receives the product data from the network interface 80 and determines on which conductor the display tag address resides. The microprocessor 82 then generates an information signal for modulating an a-c. power signal supplied to the selected conductor so that the information signal will be conveyed to the desired display tag 20. In a preferred embodiment, the nominal frequency of the power signal carried by each of the conductors $C_1$-$C_n$ is 50 KHz.

Each transceiver circuit 86 in the area controller 31 includes a digital-to-analog converter 88, a voltage-to-current driver circuit 90, and a phase-locked loop (PLL) circuit 92 or equivalent detector circuitry. The digital-to-analog converter 88 converts the digital information signal from the microprocessor 82 into analog form. Alternatively, a straight analog communication scheme with an analog oscillator can be used. The resulting analog signal is connected to the input of the driver circuit 90, which converts the analog voltage into a proportional current for driving the display tags 20 via one end of one of the conductors $C_1$-$C_n$. The other end is terminated at ground for the area controller.

The area controller 31 also includes a transformer 87 whose primary is in series with one of the conductors $C_1$-$C_n$. The transformer 87 produces a secondary voltage proportional to the primary current which is fed back to the voltage-to-current converter 90 and to the PLL input. The PLL circuit 92 senses the presence or absence of the known sub-harmonic frequency signal from any of the tags. This signal is then decoded by the MPU 82. A superheterodyne receiver may be used as an alternative to the PLL.

A d-c. to d-c. converter and battery charger 94 is used to charge a back-up battery 96, which provides at least one hour of operating power to the area controller 31. The charger 94 receives its power from the 24-volt d-c. supply 72 in the system controller 28 (FIG. 3). Thus, in the event of a power failure in the system controller 28, or during shelf relocation, the area controller 31 is able to provide uninterrupted power and control to the display tags 20 for at least one hour. This period of time should be sufficient to permit repair, and if more time is needed the battery 96 can be backed up as needed, or the tags can be put in a sleep mode, as described in more detail below.

As illustrated in FIG. 4, the location of the input end of the conductor alternates between the tag and bottom of vertically adjacent shelves. This causes any radiated signals from the loops on adjacent shelves to cancel each other, so that the overall system does not cause any radiation emission problems. The alternate phasing of the loops also reduces crosstalk between adjacent conductors and reduces the susceptibility of the system to radiation from other sources.

Figure 5:
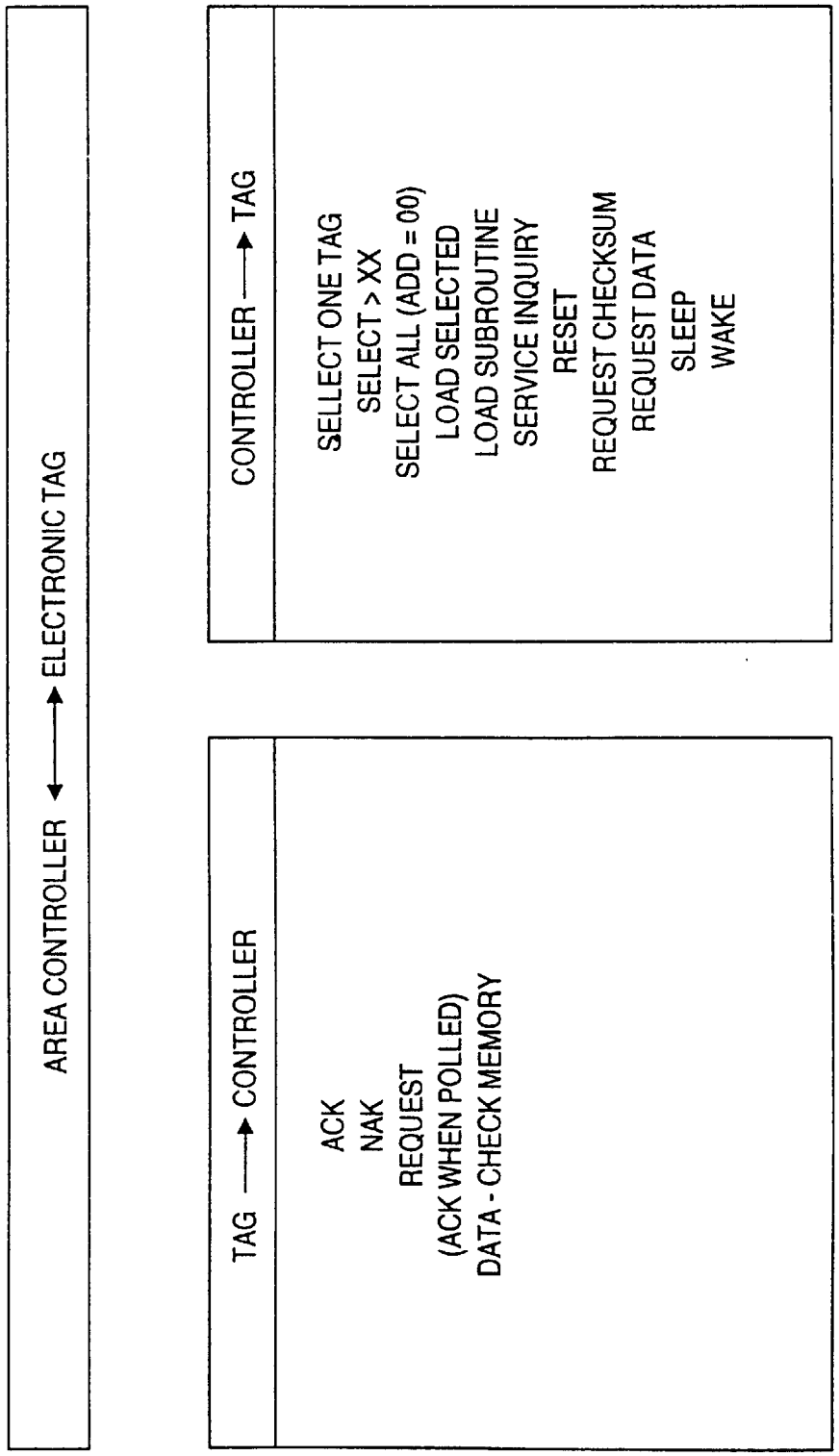
FIG. 5 is an illustration of the format of the binary word that is used for communication between the area controller and one of the electronic display tags shown in the systems of FIGS. 1 and 2.

FIG. 5 illustrates a preferred type of serial communication between one of the area controllers 31 and the associated display tags 20. The serial data sent from the area controller to the display tags may include a tag address ("select one tag") or a selected group of tags, an "all tag" command to which all tags respond when they recognize a special address, a "load selected" command which includes a particular tag address, a "load subroutine" command which loads a set of data in the unused portion of a particular tag's memory, a "service inquiry" command to query whether any tags need to communicate with the area controller, a "reset" command for resetting a particular tag, a "request checksum" command which is responded to by a tag sending a checksum corresponding to its down-loaded data (this is a price verification routine), a "request data" command which invites a tag to send selected data to the area controller, or "sleep" or "wake-up" commands which respectively remove and apply on-board power to certain circuits for each tag.

The serial data sent from the display tag to the area controller includes requests and responses. An "Ack" response means that the tag received the communication from the area controller, and a "Nak" response means that the communication failed. A "Request" is an affirmative response to a service invitation to send data to the area controller, and "Data" is the data sent in response to the area controller requesting the data.

Figure 6:
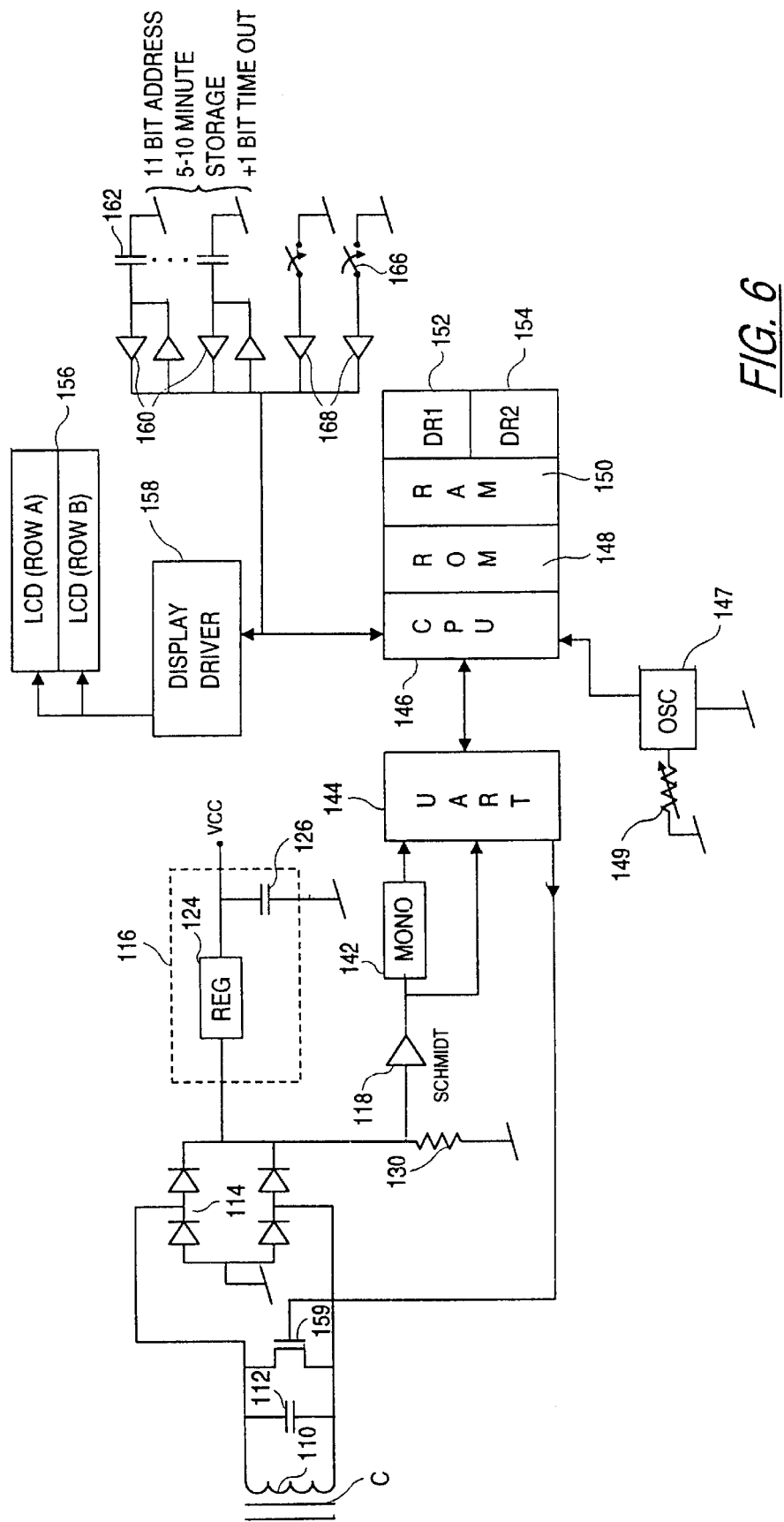
FIG. 6 is a schematic diagram of an implementation for the electronic display tag shown in the systems of FIGS. 1 and 2.
Figure 7:
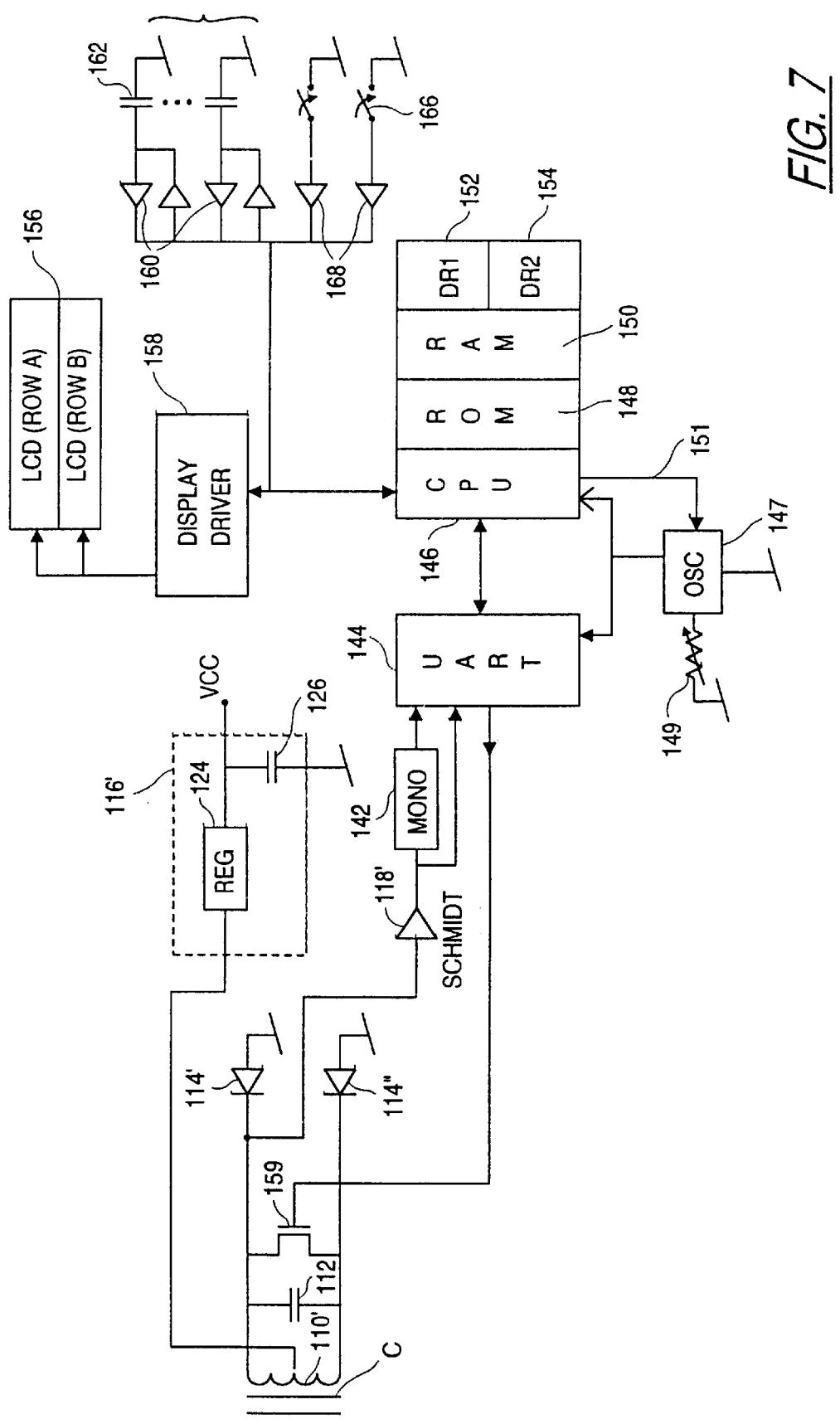
FIG. 7 is a schematic diagram of an alternative implementation for the electronic display tag shown in the systems of FIGS. 1 and 2.

FIGS. 6 and 7 illustrate two different embodiments of the display tag 20. Common reference numerals are used for common components in the two diagrams. The differences between the embodiments of FIGS. 6 and 7 concern the type of inductor 110 (or 110') utilized and the signal processing performed by a rectification circuit 114 (or 114'), a power supply circuit 116 (or 116'), and a signal conditioning circuit 118 (or 118').

Data sent to the display tag 20 via the conductor C is received by the display tag 20 using electromagnetic coupling. A pick-up coil or inductor 110 (or 110') is located close enough to the conductor C to cause the changing electromagnetic field around the conductor C to induce a corresponding current in the inductor 110. This induced current provides the display tag 20 with both the necessary operating power and the data for the display without requiring any physical contact between the display tag 20 and the conductor C. The inductive coupling of both power and information signals to the tags eliminates the need for batteries in the tags and for physical contacts between the tags and the wire loop. This minimizes the cost of the tags, and also avoids problems caused by contact corrosion and electrostatic discharges.

The preferred embodiment of the pick-up coil 110 is a single coil with a full wave bridge rectifier as shown in FIG. 6, but if desired two separate windings may be used, with one winding connected for data decoding (or demodulation) and the other winding connected for supplying power to the display tag. The pick-up coil in the preferred embodiment can be implemented by winding 43 turns of #32 enameled wire in a channel molded into the outer periphery of the tag housing, as described in more detail below in connection with FIGS. 12 and 13.

A capacitor 112 is connected in parallel with the inductor 110 to form a parallel tuned circuit that is responsive to a particular range of frequencies centered about the carrier frequency transmitted by the area controller. This resonant circuit maximizes voltage gain and significantly improves coupling efficiency.

In FIG. 6, the current induced in the coil 110 is sent through a full-wave rectifier 114 to provide a positive input to a power supply circuit 116 and a signal conditioning circuit 118. The output of the voltage regulator 124, which is connected to a capacitor 126, provides operating power ($V_{cc}$) for the display tag 20. The signal conditioning circuit 118 is preferably a Schmidt buffer which improves the rise and fall times and the signal-to-noise ratio of the signal from the coil 110. The circuit 118 can be implemented using a commercially available buffer having hysteresis control.

In FIG. 7, the induced current is produced in a pick-up coil formed by a center-tap inductor 110'. The ends of the inductor 110' are connected to a pair of rectifying diodes 114', 114" to provide a full-wave rectified positive signal for the circuit 118'. The diode 114" can be removed (replaced by a wire) for an operable half-wave rectified signal.

The power supply circuit 116' draws current from the center-tap of the inductor 110' and includes a voltage regulator 124 and a capacitor 126 at its output for providing operating power ($V_{cc}$) for the display tag 20. The power supply circuit 116' is connected to common (ground) for returning current through the diodes 114', 114" to the inductor 110'.

In both FIGS. 6 and 7, the output of the signal conditioning circuit 118 or 118' is pulse-extended using a monostable vibrator circuit 142. The output of the circuit 142 is monitored by a microcomputer (CPU) 146 for demodulating the data. A universal-asynchronous-receiver-transmitter (UART) 144 converts the sequential digital pulses from the circuit 142 into parallel format for use by the CPU 146, and vice-versa. An oscillator 147 provides the operating clock signal for both the UART 144 and the CPU 146. A manually adjustable trimming resistor 149 replaces the normally used crystal or ceramic resonator, but produces a much larger variation in oscillator frequency from tag to tag. This variation is compensated for by synchronizing the oscillator frequency to the carrier frequency, thereby permitting the use of an R-C oscillator and eliminating the cost and size of a crystal. In this instance, the oscillator cycles are counted during each half cycle, or multiple, of the rectified main primary frequency (50 KHz wave rectified to 100 KHz wave). This count is then used to generate internal frequencies that may be needed for communications.

Depending on the type of CPU 146 that is used, the buffer 118 (118'), the monostable vibrator circuit 142 and the UART 144 may not be required, since many microcomputers have input ports which can accommodate and process analog signals directly. With such microcomputers, the UART-related functions are implemented in software.

The microcomputer (CPU) 146 uses conventionally configured operating memory, including ROM 148 and RAM 150, and an LCD display memory 152, 154 for maintaining an assigned display set on an LCD display 156 and communicating with the area controller 31. The display 156 is preferably driven using a conventional two-row display driver circuit 158 controlled by the CPU 146.

To permit input signals to be manually generated at the tag, a pair of membrane switches 166 are accessible on the outside surface of the tag housing. Buffers 168, each having a conventional input pull-up resistor or current source, are connected to the switches 166, and the outputs of the buffers 168, are supplied to the CPU 146.

Use of low-power CMOS circuitry is preferred for the tags 20. This permits the power draw from the conductor C to be maintained under 25 milliwatts per tag. In a preferred embodiment, a custom CMOS integrated circuit (IC) mounted on the printed circuit board contains all of the electronics except the display, the tuned circuit, the FET 159, the capacitor 126 and the switches 166, and requires very little power to operate.

The display tag 20 can transmit signals to the area controller 31 by an impedance modulation scheme which changes the impedance of the tag circuit that is inductively coupled to the conductor C, thereby changing the impedance of the loop formed by the conductor C. This impedance change is detected by the phase-locked loop 92 in the area controller 31. To initiate such an impedance change in a display tag, the UART 144 turns on a JFET connected in parallel with the resonant circuit 110, 112. The conduction of the JFET 159 shorts the capacitor 112, thereby changing the impedance of the circuit coupled to the conductor C. Thus, by modulating the impedance of the tag circuit by successively turning the JFET 159 on and off, a signal may be induced in the conductor C at a frequency which is a sub-harmonic of the a-c. power signal which serves as the carrier signal.

To avoid naturally generated noise, the sub-harmonics are preferably generated by rendering the JFET 159 conductive during odd-number half cycles of the a-c. power signal in the wire loop. For example, if the JFET 159 is turned on during only one half cycle out of three successive half cycles of the a-c. power signal in the wire loop, the frequency of the signal induced in the loop by the tag is ⅔ the frequency of the a-c. power signal. Naturally occurring sub-harmonics do not occur at odd fractions of the primary frequency, and thus will not interfere with the signal artificially generated by the impedance modulation.

With full wave rectification, the frequency of the induced signal is $(2 F_c)/N$, where $F_c$ is the carrier frequency and N is a positive odd integer. The half cycle count with full wave rectification is $2 F_c$. When the FET is turned on every third half cycle, for example, N is 3 and the sub-harmonic is ⅔ $F_c$.

In the preferred implementation of the impedance modulation scheme, a bit of data is represented by a burst of one or more cycles of the artificially generated sub-harmonic signal. Successive bursts, of course, must be separated by periods of no impedance modulation to enable each separate burst to be detected as a separate bit of data.

To transmit both states of a binary bit of data, i.e., a "0" or a "1", the a-c. power signal can be modulated at either of two different artificially generated frequencies. For example, a "1" can be represented by a signal having ⅔ the #frequency of the a-c. power signal, while a "0" is represented by a signal having ⅖ the frequency of the a-c. power signal.

This impedance modulation technique is a way of transmitting data from the tag to the area controller in a manner which is virtually powerless. The only consumed power is that needed to turn the FET on and off.

Signals induced in the wire loop by impedance modulation in a tag are detected in the phase-locked loop 92 in the transceiver 86 of the area controller 31. The area controller's micro-processor 82 then decodes this information and determines which tag is the source of this signal. The area controller then processes this data for functions controlled by the area controller such as check sums for price verification or passes information onto the system controller 28.

Returning to FIGS. 6 and 7, the microcomputer 146 in the tag includes I/O buffers 160 and capacitors 162 for storing an assigned the bits of charges representing display tag address. The microcomputer 146 stores the down-loaded address for the tag by writing the address to the I/O buffers 160. The ports on the other side of the buffers 160 are connected to the capacitors 162. In the event of a power failure, the address is preserved by the charge on the capacitors 162 for a certain period of time. If desired, alternative means of temporary storage may be used.

As part of a multi-tiered power-backup system, the battery 96 in the area controller 31 maintains all the tags serviced by that controller in normal operation for a selected time interval following a power failure. At the end of that time interval, which is determined by the MPU 82 in the area controller, the MPU 82 generates a signal which causes the CPU 146 in each tag to turn off the tag display. All the address and product information remains stored in the tag memory, including the capacitors 162. This second stage of the power-failure mode of operation is continued for a specified period of time after which the data stored in each tag's RAM 148 and ROM 150 is erased, and only the tag addresses are preserved by the battery backup in the area controller. When the battery is exhausted, the capacitors 162 then preserve the addresses as long as the charge on the capacitors 162 is sustained. In the event a tag is removed temporarily from a rail, the capacitors 162 will maintain the address for a few minutes so that it is not necessary to manually reprogram the tag when it is reinstalled, as long as the address is maintained. This multi-level approach provides extensive safeguards to a variety of power-failure conditions.

Address programming for each tag 20 is accomplished by entering the start-up mode. The first address and associated product information data is generated by the system controller and fed to the area controllers for transmission to the display tags. This product information data appears on all the display tags running in the start-up mode. An installer then manually triggers a membrane switch 166 on the particular display tag which is to be identified by the first address, and which is to display the product information data associated with that address and the shelf product adjacent to it. When the switch is triggered, the CPU 146 captures the address and associated product information data and exits the start-up mode, thereby initiating the normal run mode in the display tag. In the normal run mode, the display tag will continuously display the product information data which is contained in the memory of the display tag until it receives an address which matches its stored address, at which time it will update the display in accordance with the information data immediately following the received address.

Upon exiting the start-up mode, the display tag sends a confirmation signal back to the system controller 28 via the conductor C and area controller 31 to inform the system controller that the first address has been captured by the appropriate tag. The system controller then sends the next address and associated product information data to the display tags. This new product information data is again displayed on all the tags that remain in the start-up mode. Visual inspection to make sure this adjacent shelf product agrees with the tag displayed information and manual triggering of successive display tags continues until all the display tags have captured addresses and display data. After any given display tag has captured an address during initialization, the system controller is able to update the information in that tag at any time.

During initial system installation only authorized personnel will have access to the display tag rails. Large retail stores typically have complete product location data in their databases, and thus the products in each area controller zone can be sorted in a sequence that enables the installer to walk down the aisle and activate the tags sequentially. This saves a significant amount of time.

Figure 8A:
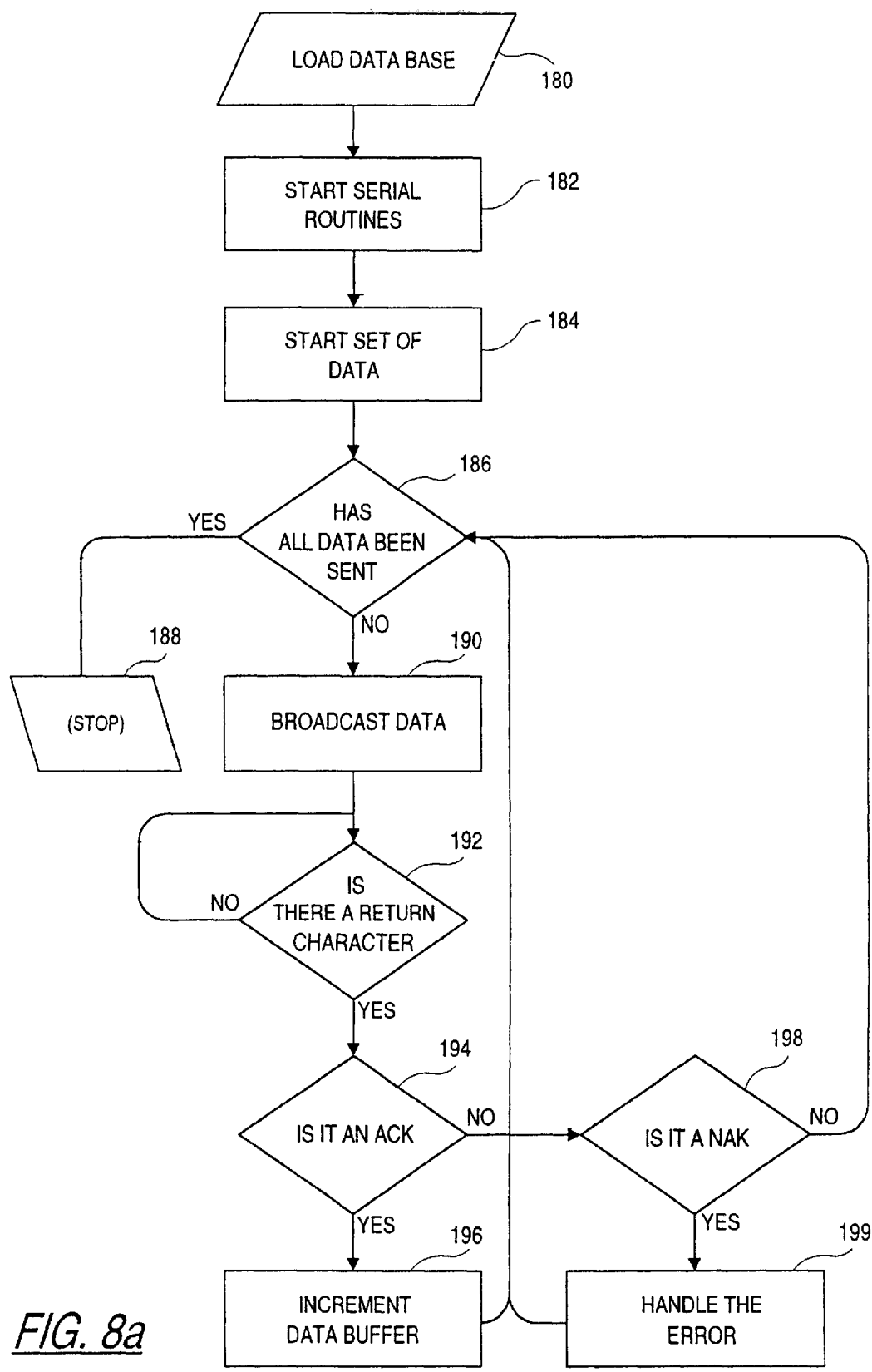
FIGS. 8a, 8b and 8c are flow charts showing how the area controller of the systems of FIGS. 1 and 2 can be implemented.

As shown in the flow chart of FIG. 8a, for communication between an area controller 31 and its tags, the data base for the tags associated with the area controller is first loaded via the system controller. Block 180 of FIG. 8a depicts this first step. After initiating the serial communication routines (block 182) and sending the product data for initializing the first tag (block 184), the MPU in the area controller determines if all tags on the system have been initialized (block 186). If the data has been sent for all the tags, the step of down-loading is complete and this routine ends, as depicted at block 188. The initial pass through block 186, however, will lead to the step of block 190 in which the MPU broadcasts the information for the next tag associated with the area controller. At block 192, the MPU waits for one of the tags to respond. If the response is an "Ack" (block 194), flow proceeds to block 196 where the MPU increments the data buffer for initializing the address for the next tag and then proceeds back to block 186. If the response is not an "Ack" (block 194), flow proceeds to block 198 where the MPU determines whether a tag has responded with a "Nak". A "Nak" indicates an error which is handled in block 199, and then flow returns to block 188. If it is neither an "Ack" nor a "Nak", the system tries to load the tag again until it times out. It then reports the error and proceeds to the next tag. This continues until all the tags are initialized with the appropriate address and product information.

Figure 8B:
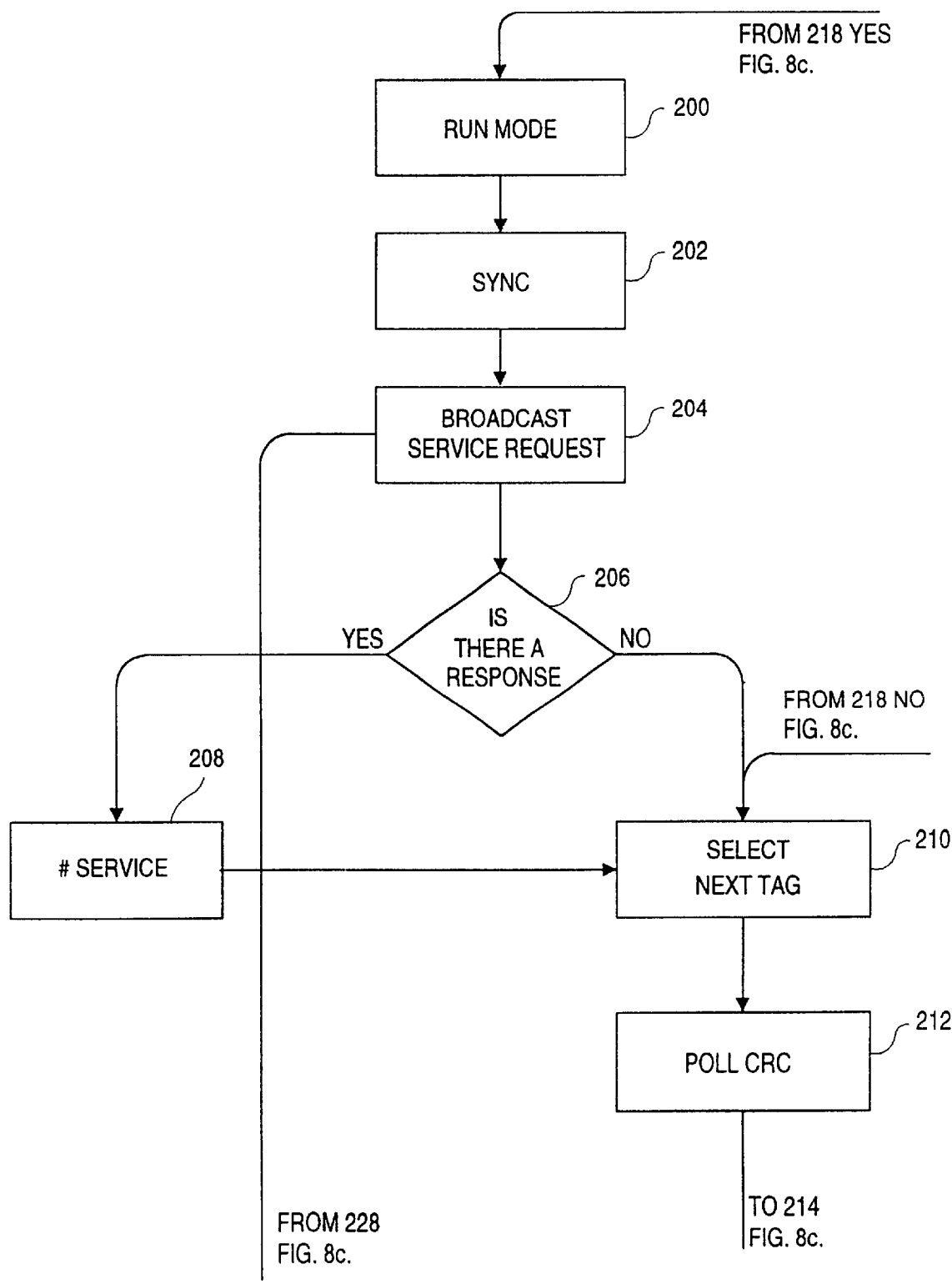
Figure 8C:
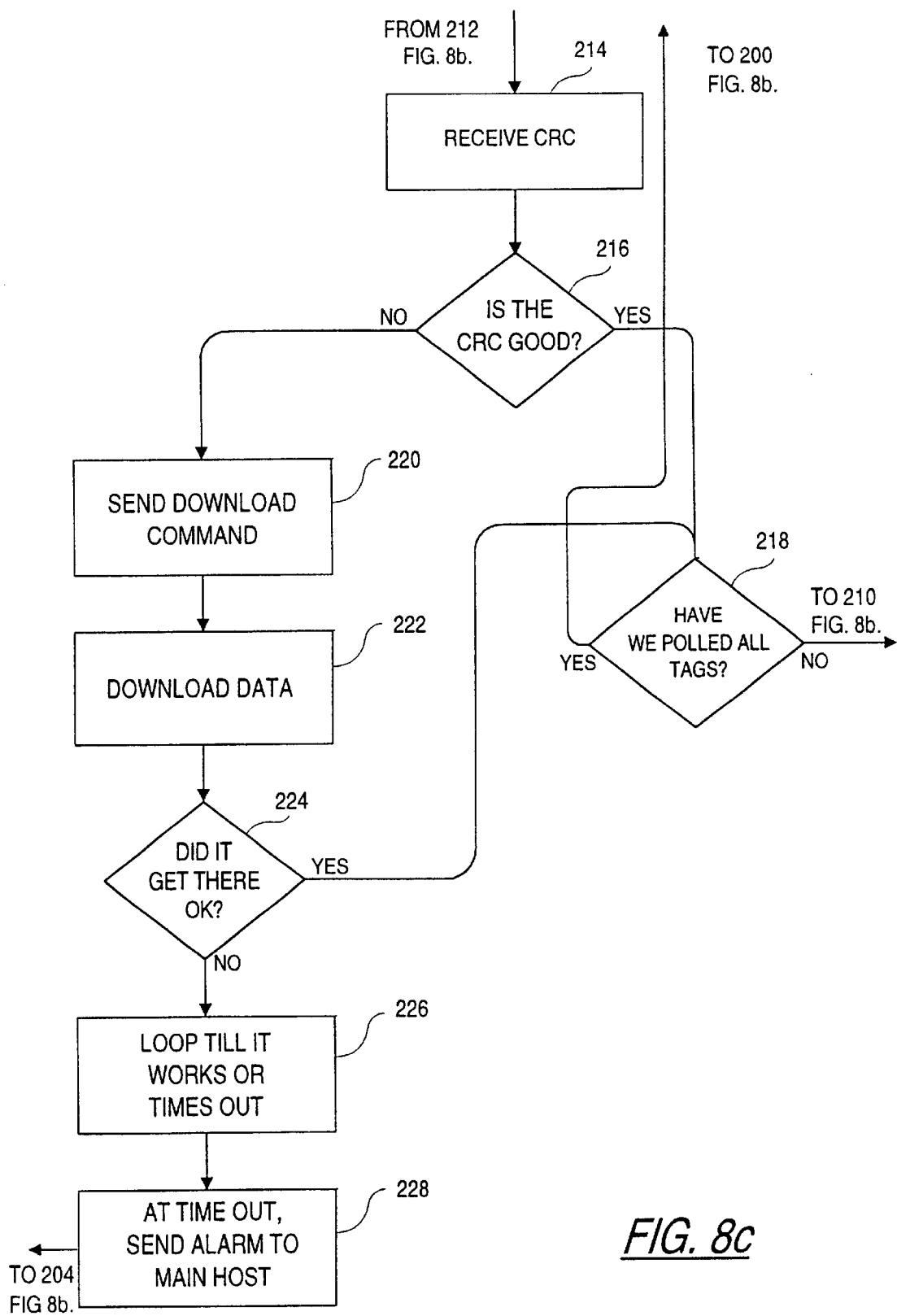

FIG. 8b illustrates how each area controller operates once the step of down-loading is complete. Blocks 200, 202 and 204 respectively depict starting the normal operation program, phase locking to the 50 KHz power signal and broadcasting to the tags for a service request.

At block 206, the area controller determines if one of the tags has responded to the service request. If there is a response, the request for service is handled as shown at block 208. If there is not a response, the area controller determines that there is no tag requesting service and flow proceeds to block 210 where a communication check for each tag in the system is begun. At block 210, the next tag is selected. At blocks 212, 214 and 216, a cyclic redundancy code (CRC) is requested from this next tag, returned by the tag and analyzed by the area controller's MPU to ensure that the tag data is correct and the tag is properly communicating. To ensure the integrity of the communication, the MPU preferably uses the "Load Subroutine" command to send data to the tag changing the loaded database. This forces the tag to send back a new CRC, which the area controller checks and verifies.

If proper communication is intact for the selected tag, flow proceeds to block 218 where the MPU determines whether all the tags have been serviced. If not flow returns to block 210 for servicing the next tag. If all the tags have been serviced, flow returns to the beginning of the program at block 200.

If the CRC is not intact for the selected tag, flow proceeds from block 216 to blocks 220 and 222 where the area controller's MPU sends a down-load command and downloads the initialization data for the tag that is not properly communicating. From block 222, flow proceeds to block 224 where the MPU executes another CRC poll, as described above, to ensure that the data was properly received by the tag and that the integrity is still intact. If the data was properly received, flow proceeds to block 218 to determine if all the tags have been serviced. If the data was not properly received, flow proceeds to blocks 226 and 228 where the MPU continues to attempt to get the data to the tag for a period of time and then reports the malfunction to the system controller. From block 228, flow returns to block 204 where another broadcast service request is made and the process repeats.

Figure 9A:
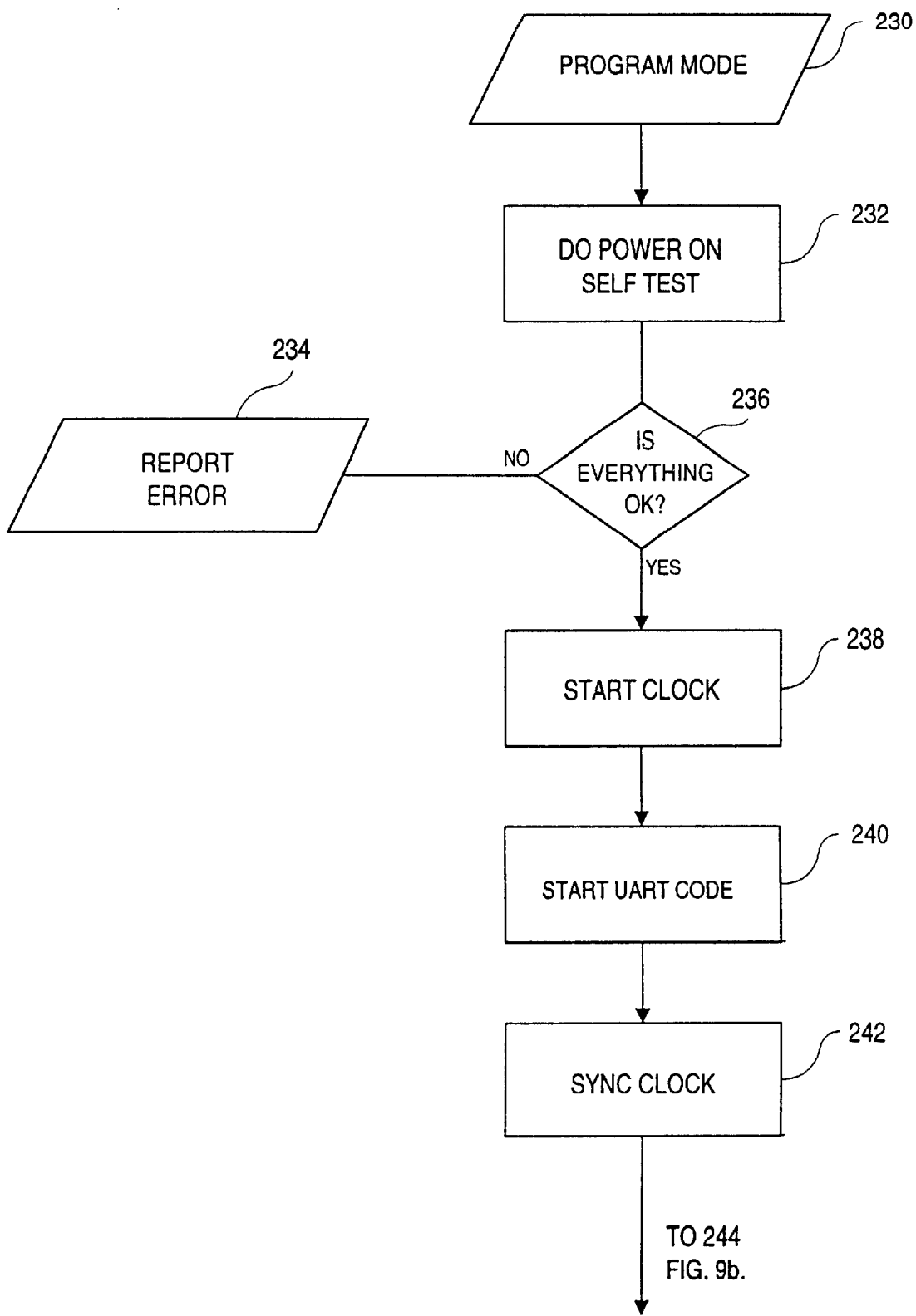
FIGS. 9a, 9b, 9c and 9d are flow charts showing how the display tag of FIGS. 1 and 2 can be implemented.
Figure 9B:
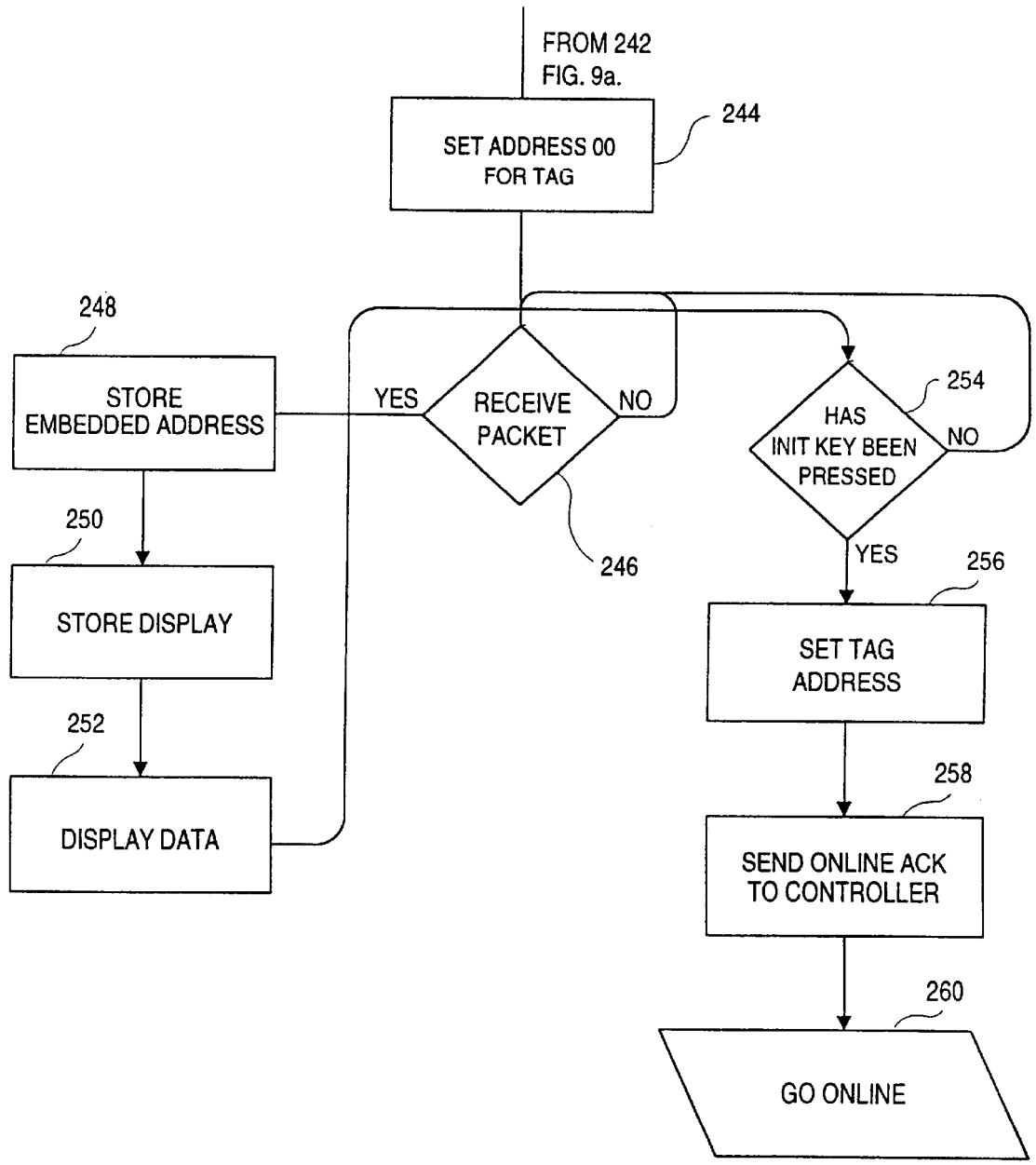

Referring now to FIG. 9a, a flow chart shows how the display tag is programmed to initialize the tag with an address and to bring the tag "on-line". This programming mode starts at block 230 and proceeds to block 232 where the microprocessor in the tag performs a power-on self-test (block 232) involving memory and register checks. At block 236, a test is performed to determine if the self-test passed. If not, flow proceeds from block 236 to 234 where the tag reports the error via the visual display. If the self-test passes, flow proceeds from block 236 to block 238, 240 and 242 where UART is initialized and the tag's clock is adjusted and phase-synchronized to the frequency (50 KHz) sensed on the power signal carried by the conductor. From block 242, flow proceeds to block 244 where the tag temporarily assigns itself tag "00," so that it can receive the "Load All" command from the area controller for address initialization.

At block 246, the tag monitors the power signal on the conductor to determine whether or not the tag has received a data packet. If a packet is received, flow proceeds from block 246 to block 248 where the tag stores the embedded address. Within the packet is the product information. From block 248, flow proceeds to blocks 250 and 252 where the tag stores the information to be displayed and displays that information on the tag's visual display.

From block 252, flow proceeds to block 254. At block 254, the tag determines if the initialization key (switch) has been manually pressed. If not, flow returns to block 246 to continually look for a packet transmitted to this tag. From block 254, flow proceeds to block 256 in response to detecting that the initialization key switch has been manually pressed.

At block 256, the tag address received within the packet is adopted by the tag. From block 256, flow proceeds to block 258 where the tag goes on-line by sending an "Ack" communication to the area controller. At block 260, the tag is depicted as going on-line. This ends the program mode for initializing the tag.

Figure 9C:
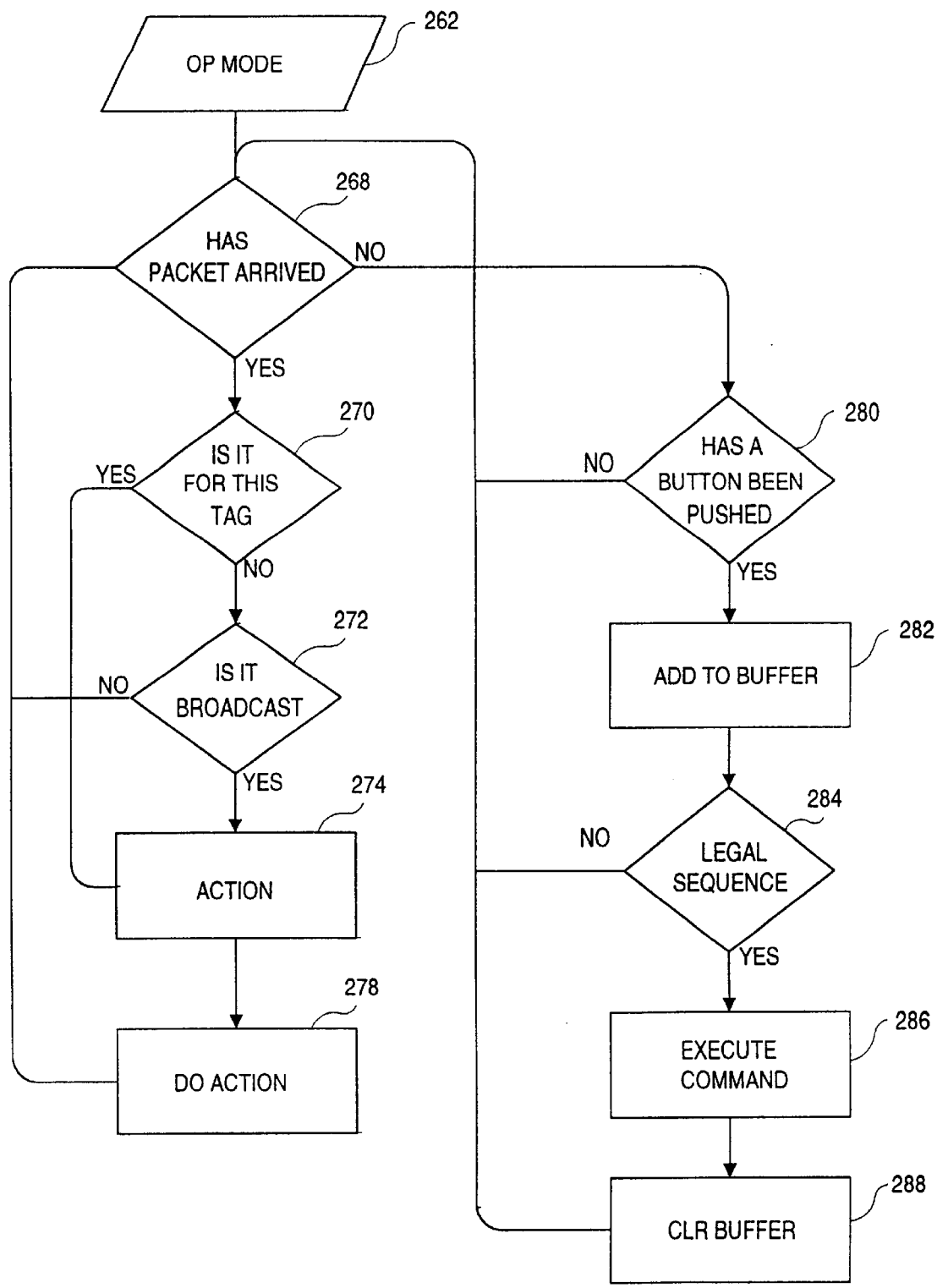

After initialization, the tag is ready for normal operation, which is depicted by the flow chart in FIG. 9c. This flow chart begins at block 262 and block 268 where the tag immediately begins monitoring the conductor to determine whether an information pack has arrived from the area controller. If such a packet has arrived, flow proceeds from block 268 to block 270 where the tag compares the address embedded in the information packet with the address of this tag to determine if the packet is for this tag. If it is not for this tag, the tag determines whether the packet represents a broadcast to all tags (such as "STORE IS CLOSING"), as depicted at block 272. If the information packet is for this tag, flow proceeds from block 270 to blocks 274 and 278 where the tag identifies and executes the necessary action associated with the received information packet.

From block 272, flow proceeds to blocks 274 and 278 if the packet is associated with a broadcast for all tags (the "All tags" command).

From block 268, flow proceeds to block 280 in response to the tag determining that a packet has not arrived over the conductor. At block 280, the tag performs a test to determine whether a manual button sequence has been entered. If such a sequence has not been entered, flow returns to block 268. If a manual button has been depressed, flow proceeds from block 280 to blocks 282 and 284 where the tag determines if the sequence is one of the valid sequences. If it is not a valid sequence, flow returns to block 268. If it is a valid sequence, flow proceeds from block 284 to block 286 where the command is executed. From block 286, flow proceeds to block 288 where the buffer is cleared and flow returns to block 268.

The sequences are binary numbers entered by depressing membrane switches representing "0" or "1". Valid sequences include binary sequences corresponding to requests for: resetting the tag; entering the cursor mode (FIG. 9c); verifying the status of the tag and verification codes. Clearing the software buffer which stores the binary digits entered through the switches occurs after a time-out.

Figure 9D:
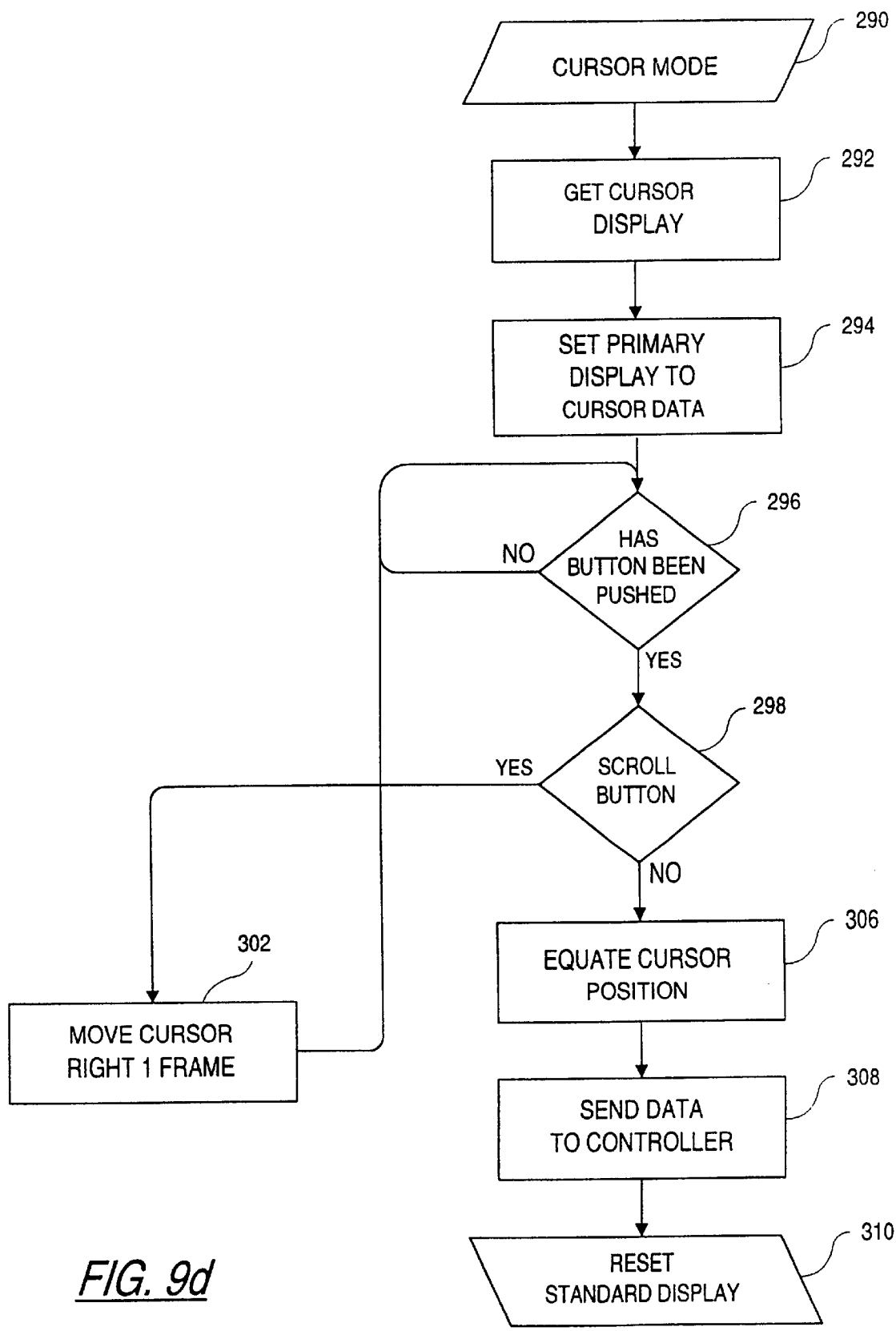

Turning now to FIG. 9d, a flow chart for implementing the cursor mode for the display tag is shown. This routine is executed in response to a valid manually-entered sequence.

The cursor mode begins at blocks 290, 292 and 294, where the tag sets up the display with a cursor position movable by one of the buttons, the scroll button. At blocks 296 and 298, the tag performs a test to determine whether a scroll button has been depressed. If so, flow proceeds to block 302 where the tag changes (or scrolls through) to the next cursor code position. From block 302, flow returns to blocks 296 and 298 where the tag performs yet another test to determine if the scroll button has been depressed. This continues with the display code position being changed with each depression of the scroll button (switch). When the other switch (the "select button") is depressed, the current cursor position is equated with a package (or function), as indicated at block 306. The current position of the cursor is returned to the area controller thereby selecting the associated data block. The area controller may optionally await a verification to be entered into the buttons on this tag before acting on selected data.

In summary, one membrane switch is used to select a displayed code and position the cursor to a selected display character position, and the other switch is used to terminate the cursor mode, selecting the last position of the cursor. Such an implementation is ideally used for reordering products and alerting the system controller as to the status of the product for the associated tag.

From block 306 flow proceeds to block 308 where the tag sends the set of selected codes to the area controller. At block 310, the tag resets the display.

Figure 10:
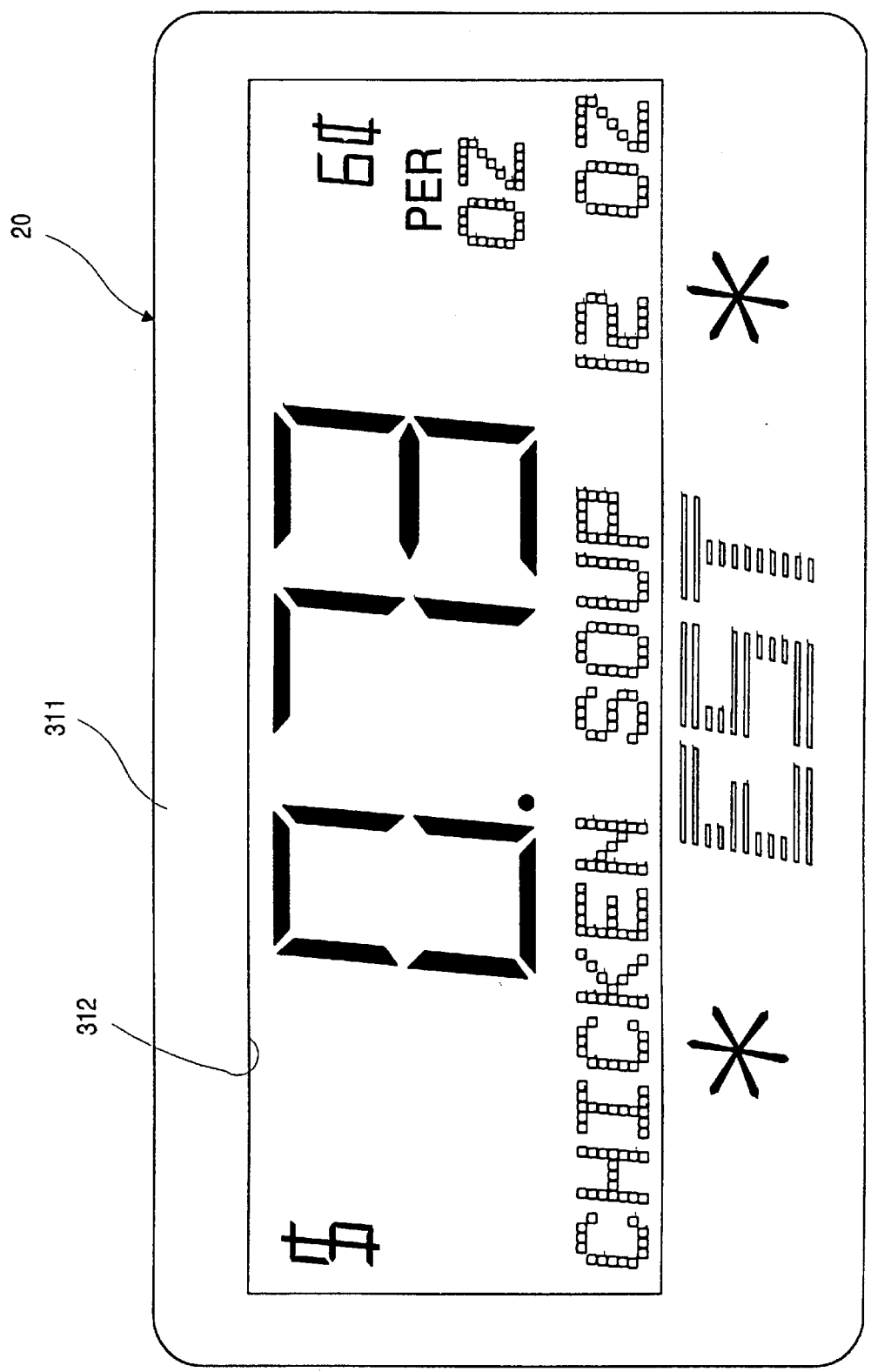
FIG. 10 is an enlarged front elevation of an implementation of a display tag for use in the system of FIGS. 1 and 2.
Figure 11:
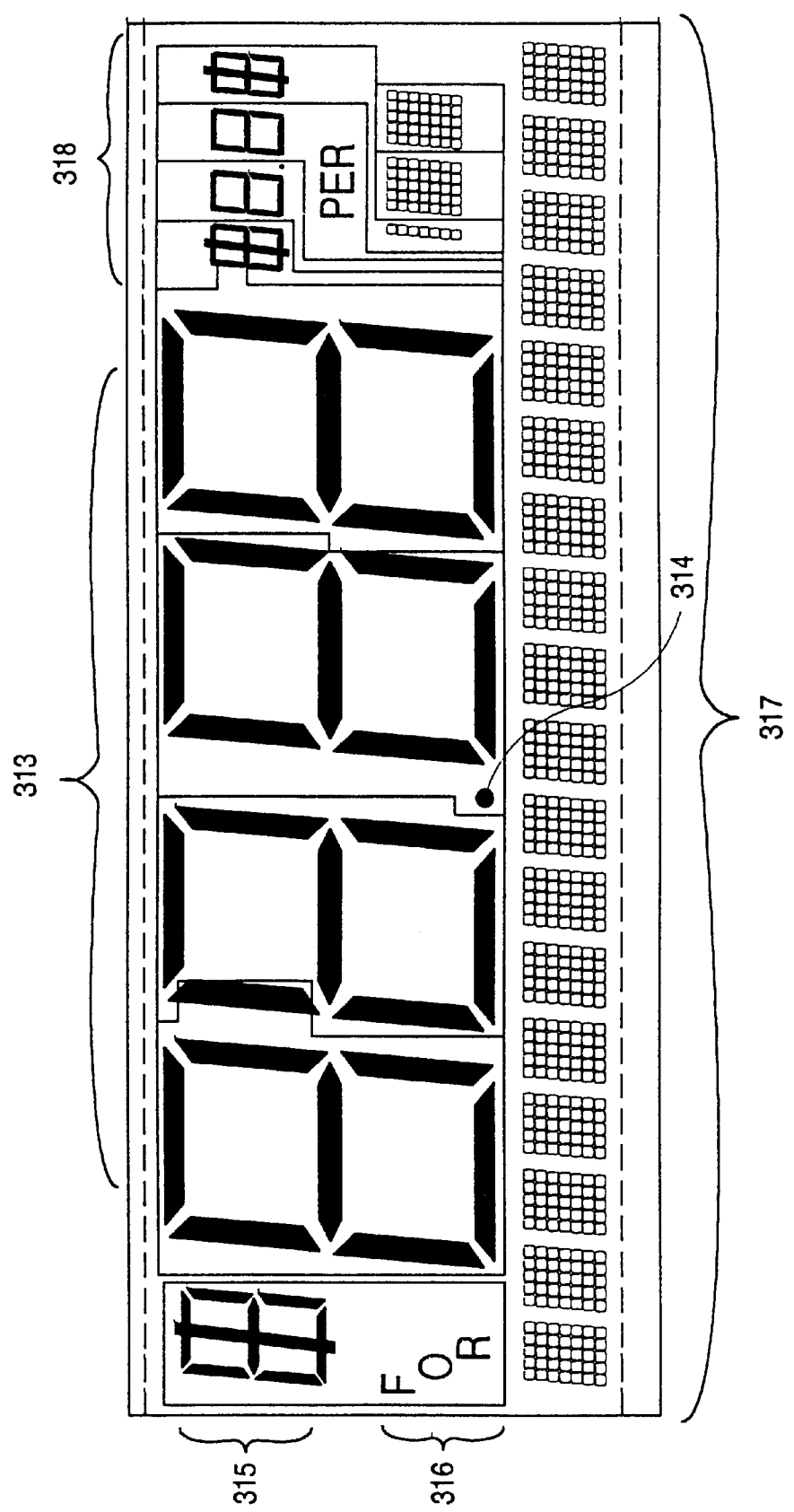
FIG. 11 is an enlarged front elevation of the liquid crystal display used in the tag of FIG. 10.

FIG. 10 illustrates a front view of the tag 20 shown in the previously-discussed figures and FIG. 11 shows the details of the face of the LCD display. The printed circuit board or flex circuit carrying the electronic components for the tag 20 is concealed within the tag housing 311. The front wall of the housing forms a rectangular aperture for the LCD display, which includes four seven-segment characters 313, a decimal point 314, an eight-segment units identifier 315, and a "for" annunciator 316 for displaying prices for quantity purchases; an 18-character alpha-numeric display 317 (either 5×7 matrix or 14 segments) for product descriptions; and a zone 318 with a combination of characters to display cost per unit. A display driver such as FD2258f/FC2258A/FC2258K manufactured by Fuji Electric is used to translate the parallel data from the memory into the conventional drive signals for the LCD display. The display is shown to be of the LCD type, but LED's or other types of electronically controlled displays can be used. To seal the display window in the tag housing 311, a clear film may be bonded to the front of the tag housing to cover the display window.

Figure 12:
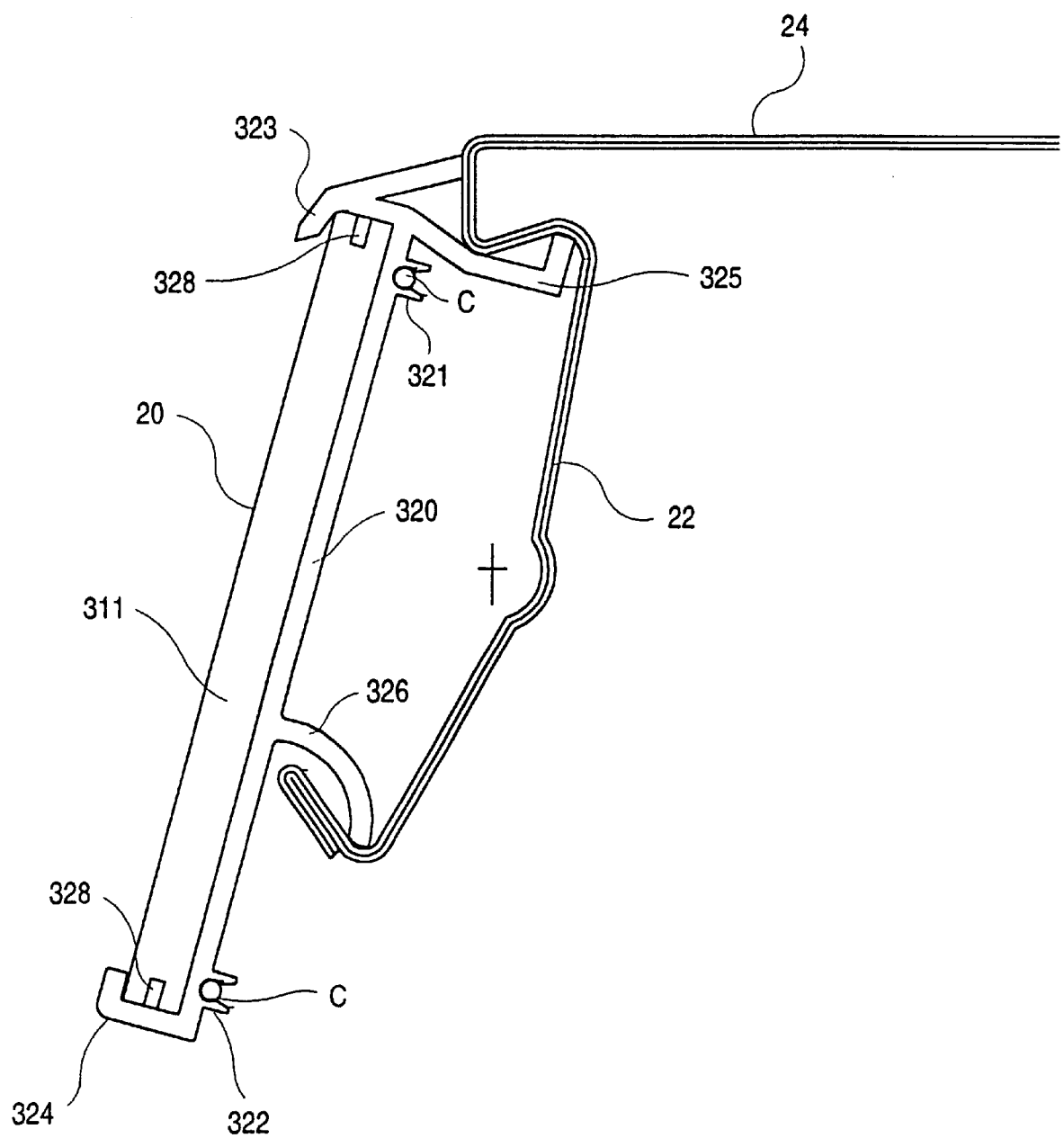
FIG. 12 is an enlarged section of an implementation of the display tag and conductor mounted on a shelf rail.
Figure 13:
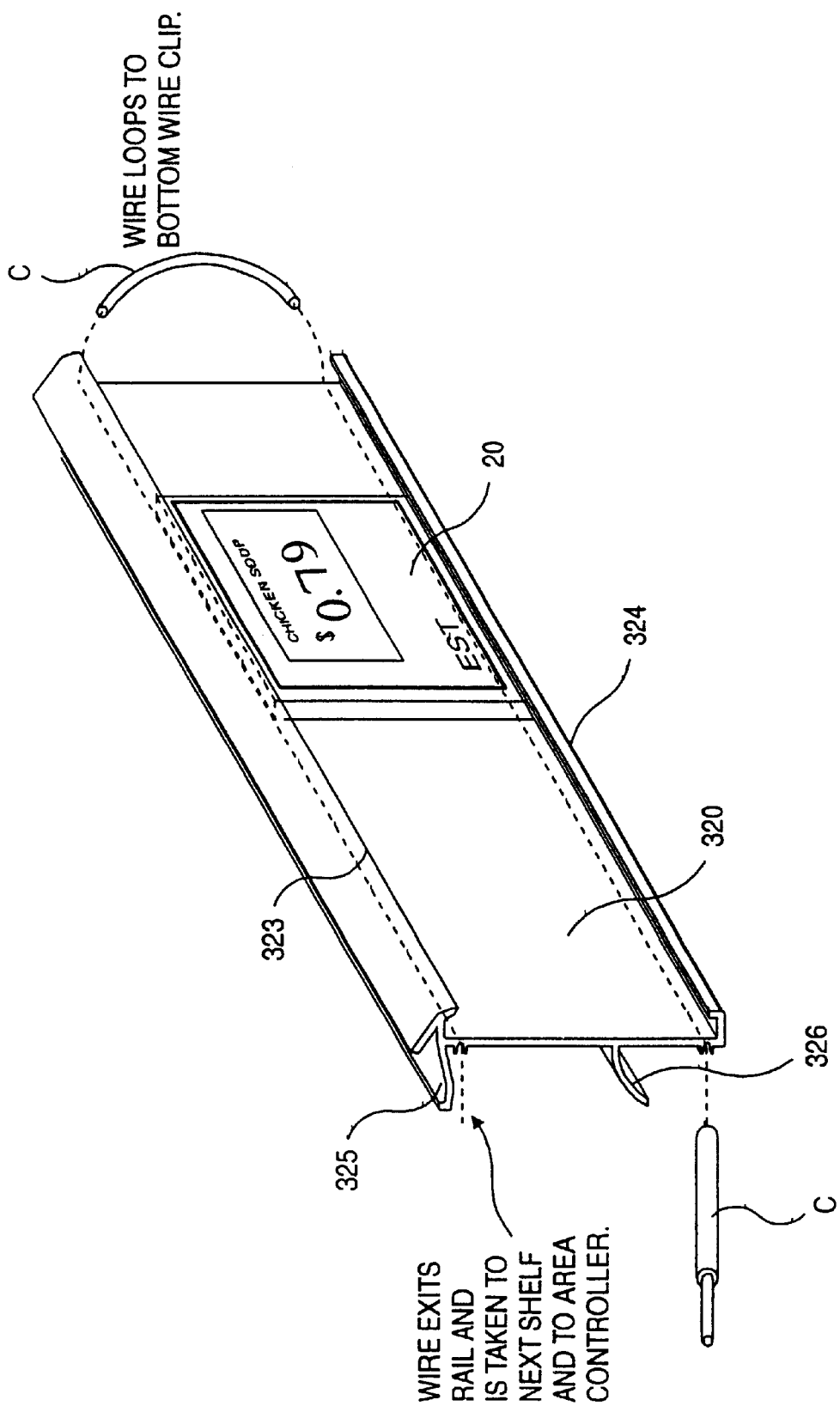
FIG. 13 is a front perspective view of the implementation shown in FIG. 12.

FIGS. 12 and 13 illustrate a preferred arrangement for mounting the display tags 20 on a conventional shelf 24 which includes a depending rail 22 formed as an integral part of the shelf. An auxiliary rail 320 is snapped into the shelf rail 22 and extends continuously along the full length of the shelf for receiving both the display tags 20 and the conductor C.

The auxiliary rail 320 is designed so that the display tag 20 and the conductor C may be snapped into place anywhere along the length of the rail. The insulated conductor C is mounted in two channels 321 and 322 formed near the top and bottom of the rear wall of the rail 320. The tag is received in a channel formed in the front side of the rail 320. The tag is recessed inside, and held in place by, a pair of flanges 323 and 324 so that the tag does not protrude from the rail. The upper flange 323 is flared outwardly at a slight angle so that it can be bent upwardly and outwardly for installation and removal of tags from the front of the rail. A pair of rearwardly projection flanges 325 and 326 hold the rail 320 in place on the shelf rail 22.

As shown in the cross-section of the tag 20 in FIG. 12, the pick-up coil 110 is wound around the periphery of the tag housing 311 in a channel 328 formed in all four edges of the housing. When the display tag is attached to the rail 320, the coil segments located in the top and bottom sections of the channel 328 are in close proximity to the two segments of the conductor C on the rear side of the rail 320. Thus, the coil is electromagnetically coupled to both segments of the conductor C.

As shown in the perspective view of the tag of FIG. 13, a single conductor C is snapped into the top channel 321 of the rail 320, spans the length of the store shelf, and then loops to the bottom channel 322 of the rail 320 and spans the length of the shelf rail again. Alternate phasing of vertically adjacent shelves, as described above in connection with FIG. 4, minimizes cross talk between adjacent conductors along the shelves and avoids any significant radiation of signals from the entire system or susceptibility from other sources.

Figure 14:
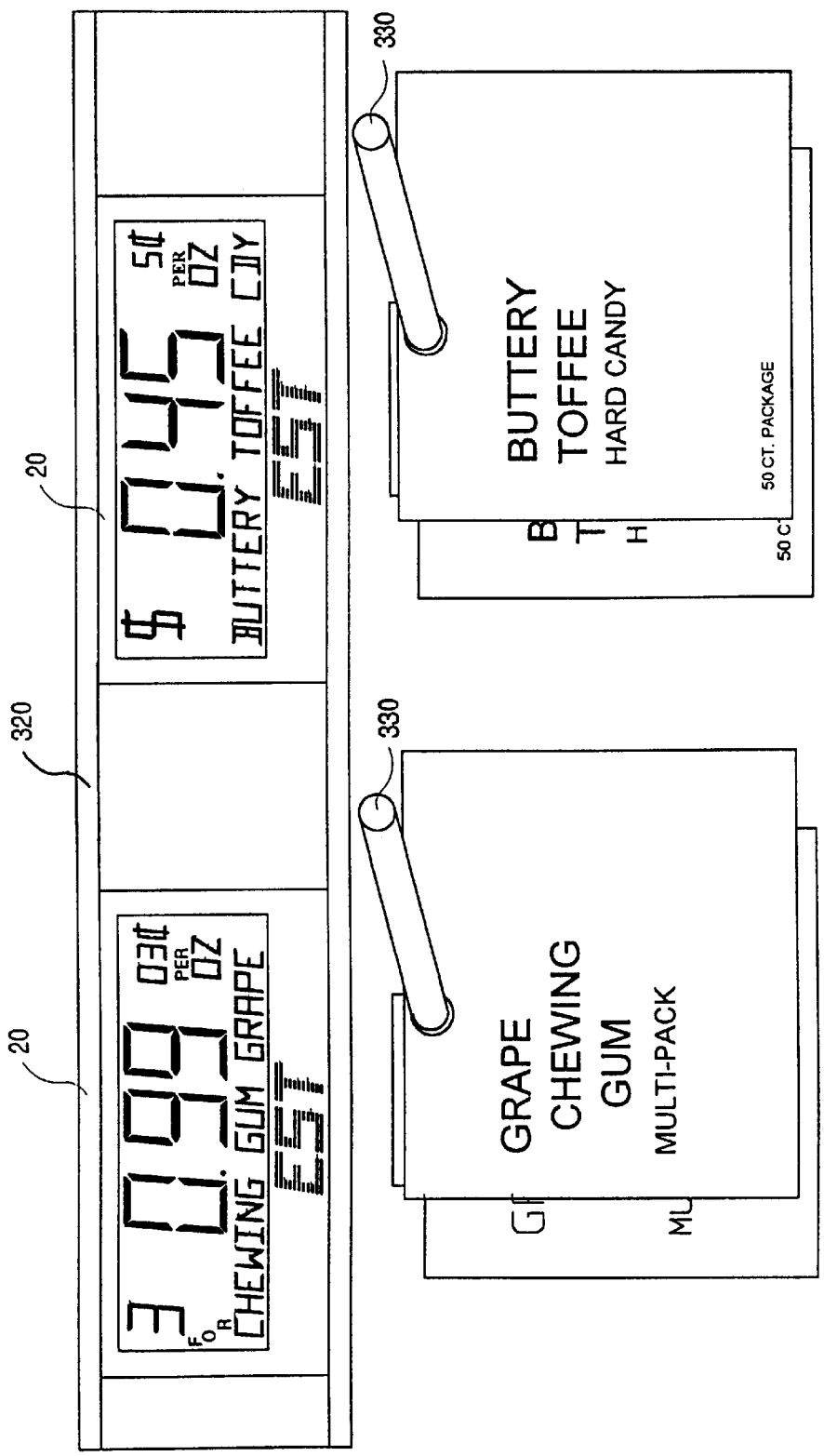
FIG. 14 is a front elevation of a display tag arrangement for display racks of the type used to display products in blister packs.

FIG. 14 illustrates a display tag arrangement for products which are displayed on racks rather than shelves. This type of display rack is commonly used for products which are packaged in blister packages. The rack includes multiple rods 330, each of which supports multiple packages. A package can be removed from the rod by simply sliding the package off the forward end of the rod.

In the arrangement of FIG. 14, a rail 320 is mounted directly above the rods 330, and contains a separate display tag 20 for each of the rods 330. The conductor C is fasten to the rear side of the rail 320 in the same manner described above in connection with FIGS. 12 and 13.

Figure 15:
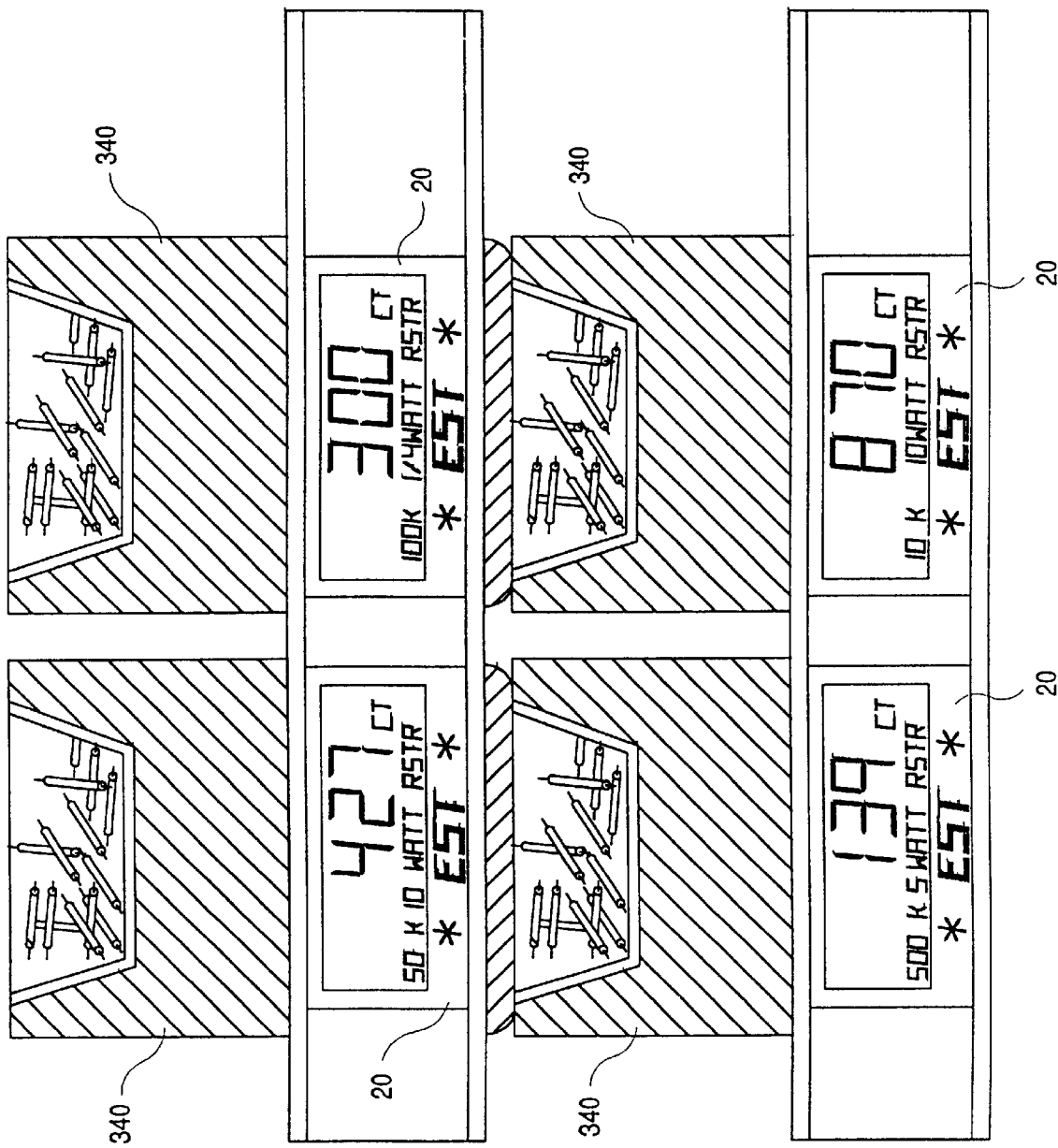
FIG. 15 is a front elevation of a display tag arrangement for multiple product bins in a warehouse.

FIG. 15 illustrates the use of the electronic display tag system of invention in a warehouse environment. Many warehouses contain numerous bins containing many different kinds of small articles which are difficult to identify from the markings on the articles themselves. FIG. 15 contains a diagrammatic illustration of four such bins 340. To identify the articles in the respective bins, a rail 320 is mounted directly beneath each row of bins, and contains a separate display tag for each bin. Again, the conductor C is mounted on the rear side of each of the rails 320.

It will be appreciated that various modifications and changes may be made to the exemplary embodiments illustrated and described herein without departing from the true spirit and scope of the present invention, which is set forth in the following claims.

What is claimed is:

1. A back-up power system for an information display system, the information display system comprising a control circuit for generating information and power signals, a plurality of electronic display tags, and a conductor for carrying information and power signals between the control circuit and the display tags, each display tag having a processor, a memory interfaced with the processor and containing a tag address and display data, and a visual display for displaying the display data contained in the memory, the back-up power system comprising:

an uninterruptible power supply connected to the control circuit for providing the control circuit with continuous power in the event of a power failure;

control means responsive to a power failure for supplying power to said display tags from said uninterruptible power supply for a first prescribed period of time following the power failure;

means responsive to expiration of said first prescribed period of time and continuation of the power failure for turning off the tag displays while continuing to supply power to the tags from said uninterruptible power supply to retain the address and display data stored in the display tags' memories for a second prescribed period of time; and means responsive to expiration of said second prescribed period of time and continuation of the power failure for turning off power to the tag memory but retaining the tag address.

2. The backup power system of claim 1 wherein each tag includes multiple capacitors for retaining data bits representing the tag address.

3. A method of providing power to an information display system in the event of a power failure, the information display system comprising a control circuit for generating information and power signals, an uninterruptible power supply connected to the control circuit and providing continuous power to the control circuit, a plurality of electronic display tags, a first conductor for providing an information signal generated by the control circuit to the display tags, a first conductor for providing a power signal generated by the control circuit to the display tags, each display tag having a processor, a memory interfaced with the processor and containing an address and display data, a visual display for displaying the display data contained in the memory, and a plurality of capacitors connected to the processor for storage of the tag address, the method comprising the steps of:

providing power to the display tag for normal operation of the tag after a power failure for a first prescribed period of time;

detecting a loss of power upon expiration of the first prescribed period of time and turning off the tag display while retaining the address and display data therein for a second prescribed period of time; and detecting a continued loss of power upon expiration of the second prescribed period of time and turning off power to the balance of the tag but retaining the tag address in the plurality of capacitors.

* * * * *